United States Patent
Marks

(10) Patent No.: US 10,657,770 B2
(45) Date of Patent: *May 19, 2020

(54) SYSTEM AND METHOD OF PROVIDING A FEATURE GAME WITH MULTIPLE GAME INSTANCES

(71) Applicant: Aristocrat Technologies Australia Pty Limited, North Ryde, NSW (AU)

(72) Inventor: Daniel Marks, Decatur, GA (US)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,687

(22) Filed: Aug. 9, 2018

(65) Prior Publication Data

US 2019/0051109 A1    Feb. 14, 2019

Related U.S. Application Data

(60) Provisional application No. 62/543,245, filed on Aug. 9, 2017, provisional application No. 62/553,971, filed
(Continued)

(51) Int. Cl.
*G07F 17/32* (2006.01)
*G06Q 50/34* (2012.01)
(Continued)

(52) U.S. Cl.
CPC ............ *G07F 17/326* (2013.01); *G06F 7/582* (2013.01); *G06Q 50/34* (2013.01);
(Continued)

(58) Field of Classification Search
CPC ............ G07F 17/3211; G07F 17/3213; G07F 17/326; G07F 17/3265; G07F 17/34; G07F 17/3262
(Continued)

(56) References Cited

U.S. PATENT DOCUMENTS 7,056,215 B1 * 6/2006 Olive ...................... G07F 17/32
463/27
7,819,741 B1 * 10/2010 Luciano .................. G07F 17/32
463/16
(Continued)

OTHER PUBLICATIONS

U.S. Office Action dated Oct. 4, 2019, in U.S. Appl. No. 16/059,596.
(Continued)

*Primary Examiner* — Michael A Cuff
(74) *Attorney, Agent, or Firm* — Weaver Austin Villeneuve & Sampson LLP

(57) ABSTRACT

A gaming machine provides a base game, from which a hold and spin feature game is triggered when a determined number of configurable symbols are displayed in a base game outcome. When the feature game is triggered, the configurable symbols are held in place on the display and the player is provided one or more spins during the feature game in which to collect additional configurable symbols. Any additional configurable symbols are retained on the display during subsequent spins until the feature game is completed. At the end of the feature game, the player is awarded a prize based on the values carried by the configurable symbols. An ante bet entitles to player to additional game instances in the hold and spin feature game. The additional game instances duplicate the configurable symbols that trigger the feature game, but are played independently from one another during the hold and spin feature.

13 Claims, 33 Drawing Sheets

Related U.S. Application Data on Sep. 4, 2017, provisional application No. 62/658,325, filed on Apr. 16, 2018.

(51) Int. Cl.
*G07F 17/34* (2006.01)
*G06F 7/58* (2006.01)

(52) U.S. Cl.
CPC ...... *G07F 17/3211* (2013.01); *G07F 17/3258* (2013.01); *G07F 17/3262* (2013.01); *G07F 17/3265* (2013.01); *G07F 17/34* (2013.01)

(58) Field of Classification Search
USPC ..................................................... 463/16–20
See application file for complete search history.

(56) References Cited

U.S. PATENT DOCUMENTS

| | | | |
|---|---|---|---|
| 8,360,851 B2 | 1/2013 | Aoki | |
| 8,821,256 B2* | 9/2014 | Okada | G07F 17/32 273/138.1 |
| 9,424,720 B2 | 8/2016 | Suda | |
| 9,928,691 B2 | 3/2018 | Olive | |
| 2003/0216165 A1 | 11/2003 | Singer et al. | |
| 2004/0137982 A1 | 7/2004 | Cuddy et al. | |
| 2006/0063584 A1* | 3/2006 | Brill | G07F 17/3244 463/20 |
| 2006/0189369 A1 | 8/2006 | Taylor | |
| 2009/0042652 A1* | 2/2009 | Baerlocher | G07F 17/32 463/42 |
| 2009/0075722 A1* | 3/2009 | Louie | G07F 17/32 463/20 |
| 2009/0215515 A1* | 8/2009 | Meyer | G07F 17/32 463/20 |
| 2009/0239634 A1 | 9/2009 | Nguyen | |
| 2010/0234092 A1 | 9/2010 | Gomez et al. | |
| 2011/0105218 A1* | 5/2011 | Anderson | G07F 17/32 463/20 |
| 2012/0178517 A1 | 7/2012 | Montenegro | |
| 2013/0079118 A1* | 3/2013 | Ellis | G07F 17/3244 463/25 |
| 2014/0274292 A1 | 9/2014 | Suda | |
| 2014/0274316 A1* | 9/2014 | Elias | G07F 17/34 463/25 |
| 2014/0323198 A1 | 10/2014 | Tuck | |
| 2016/0042614 A1* | 2/2016 | Kojima | G07F 17/34 463/20 |
| 2016/0086430 A1* | 3/2016 | Kitamura | G07F 17/3244 463/21 |
| 2016/0163152 A1* | 6/2016 | Ko | G07F 17/3244 463/20 |
| 2017/0061743 A1* | 3/2017 | Itagaki | G07F 17/34 |
| 2017/0092042 A1* | 3/2017 | Nakamura | G07F 17/3213 |
| 2017/0154498 A1 | 6/2017 | Olive | |
| 2018/0089948 A1* | 3/2018 | Olsen | G07F 17/3262 |
| 2018/0130298 A1* | 5/2018 | Koshorek | G07F 17/3244 |
| 2018/0268655 A1 | 9/2018 | Olive | |
| 2019/0051097 A1 | 2/2019 | Marks et al. | |
| 2019/0051108 A1 | 2/2019 | Marks | |
| 2019/0051113 A1 | 2/2019 | Marks et al. | |

OTHER PUBLICATIONS

U.S. Office Action dated Oct. 4, 2019, in U.S. Appl. No. 16/059,629.
U.S. Office Action dated Oct. 4, 2019, in U.S. Appl. No. 16/059,769.
U.S. Appl. No. 16/558,735, filed Sep. 3, 2019, Marks et al.
U.S. Appl. No. 16/566,446, filed Sep. 10, 2019, Marks et al.
U.S. Notice of Allowance dated Jan. 24, 2020, in U.S. Appl. No. 16/059,596.
U.S. Notice of Allowance dated Mar. 3, 2020, in U.S. Appl. No. 16/059,629.
U.S. Notice of Allowance dated Mar. 16, 2020, in U.S. Appl. No. 16/059,769.

* cited by examiner

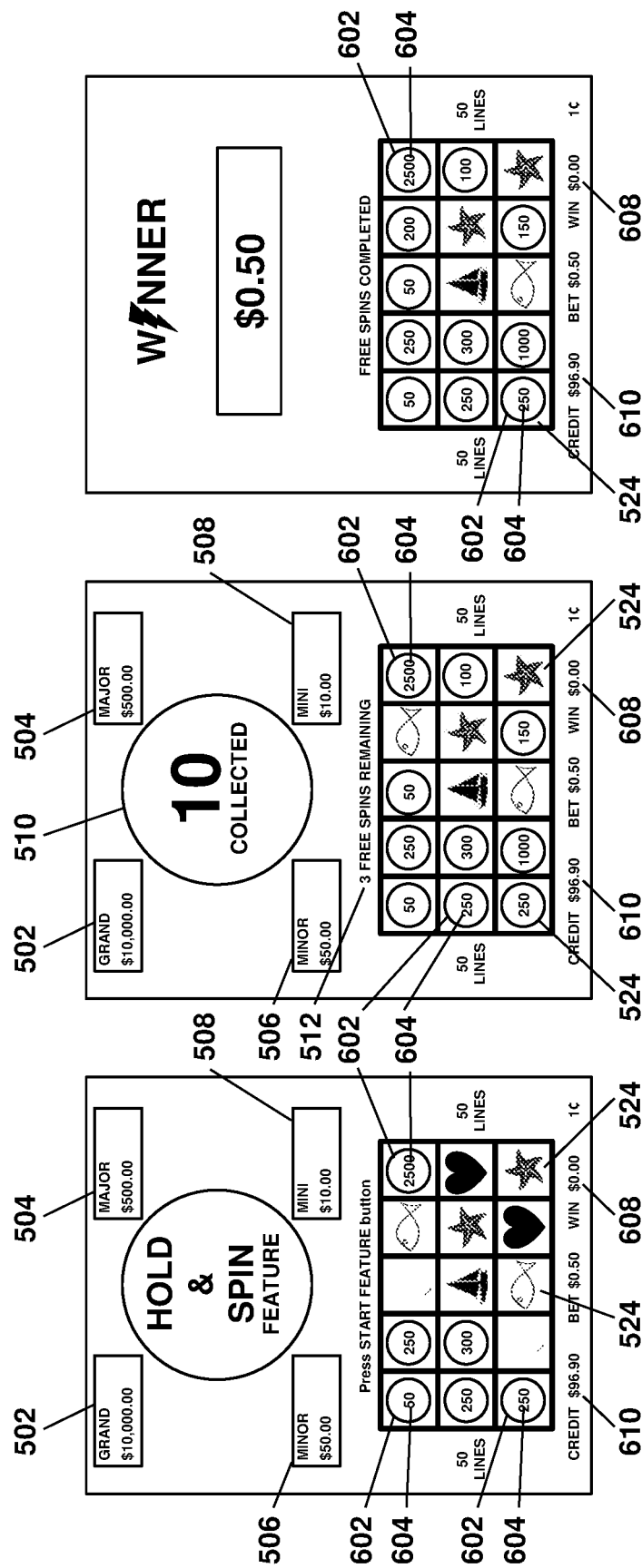

US 10,657,770 B2

SYSTEM AND METHOD OF PROVIDING A FEATURE GAME WITH MULTIPLE GAME INSTANCES

RELATED APPLICATIONS

The present application claims priority to U.S. Provisional Patent Application No. 62/543,245, filed Aug. 9, 2017, and entitled "SYSTEM AND METHOD OF PROVIDING A FEATURE GAME", U.S. Provisional Patent Application No. 62/553,971, filed Sep. 4, 2017, and entitled "GAMING SYSTEM AND METHOD OF GAMING", and U.S. Provisional Patent Application No. 62/658,325, filed Apr. 16, 2018, and entitled "GAMING MACHINE AND METHOD FOR PROVIDING A FEATURE GAME", which are all hereby incorporated by reference in their entireties.

BACKGROUND

Electronic gaming machines ("EGMs") or gaming devices provide a variety of wagering games such as slot games, video poker games, video blackjack games, roulette games, video bingo games, keno games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical wagering games use a random number generator (RNG) to randomly determine the outcome of each game. The wagering game is designed to return a certain percentage of the amount wagered back to the player (RTP=return to player) over the course of many plays or instances of the game. The RTP and randomness of the RNG are critical to ensuring the fairness of the games and are, therefore, highly regulated. Upon initiation of play, the RNG randomly determines a game outcome and symbols are then selected which correspond to that outcome. Notably, some games may include an element of skill on the part of the player and are, therefore, not entirely random.

In existing gaming systems, feature games, secondary or bonus games, may be triggered for players in addition to the base game. A feature game gives players an additional opportunity to win prizes, or the opportunity to win larger prizes, than would otherwise be available in the base game. Feature games can also offer altered game play to enhance player enjoyment.

The popularity of such gaming machines with players is heavily dependent on the entertainment value of the machine relative to other gaming options and the player's gambling experience. Operators of gaming businesses therefore strive to provide the most entertaining, engaging, and exciting machines to attract customers to use the machines while also providing a machine that allows the player to enjoy their gambling experience. Accordingly, there is a continuing need for gaming machine manufacturers to develop new games in order to maintain or increase player enjoyment.

SUMMARY

Aspects of the present disclosure relate to gaming machines and electronic gaming methods in which a feature game may be triggered during play of a base game.

In an embodiment, a video slot machine includes a base game and a feature game that may be triggered by the base game.

In some embodiments, the base game may use a plurality of symbol display positions arranged in a matrix or an array of rows and columns. In some embodiments, the columns may be reels that spin and stop to populate the display matrix with game symbols.

In some embodiments, the symbols appearing in the display positions can produce a scatter pay award. In some embodiments, the scatter pay award may be based on the appearance of special symbols ("scatter symbols") in the display matrix. The particular symbols do not need to appear in any predefined order or orientation relative to the symbol positions of the array.

In response to the appearance of the special symbols to form a scatter pay award, a scatter pay bonus feature may be conducted to determine the amount of the award to the player.

In some embodiments, the appearance of a number, such as six (6) or more, of special symbols in a base game outcome in the display matrix will trigger the scatter pay bonus feature.

In an embodiment, the special symbols may include configurable symbols that have at least a common component and a variable component, wherein the variable component is indicative of a value of a prize that is associated with a respective configurable symbol.

In some embodiments, the configurable symbols may include value symbols, which each display a respective numeric value, e.g., a number of credits or currency.

In some embodiments, the configurable symbols may include jackpot symbols, which each display the name of a particular jackpot, e.g., a MINI jackpot, MINOR jackpot, MAXI jackpot, MAJOR jackpot or GRAND jackpot. In some embodiments, at least some of the jackpots may have fixed values. In some other embodiments, at least some of the jackpots may be progressive jackpots whose value increases for each wager that is placed on a base game by the amount proportional to said wager.

In various embodiments, a predetermined number of spins are awarded to the player in the scatter pay bonus feature. In some embodiments, the scatter pay bonus feature game may be a Hold & Spin feature game where all of the configurable symbols are held in place in the display matrix for the predetermined number of spins and the symbols in the remaining symbol positions are spun. The spin of symbols in the remaining symbol positions may be accomplished by individual reel strips. The resulting spin may produce additional configurable symbols which are, in turn, added to the "hold" symbols and remain fixed for any remaining spins. After the predetermined number of spins are completed, the sum total value of all "hold" symbols is awarded to the player.

In some embodiments, the configurable symbols may include repeater symbols whose value is not determined until a feature game is triggered. In an embodiment, the value of the repeater symbol is generated based on the value(s) of one or more of the configurable symbols that trigger a respective feature game. In an embodiment, the value of the repeater symbol is determined by summing the values of the configurable symbols that trigger a respective feature game. For example, in an instance where a feature game is triggered by configurable symbols having values of 10 credits, 10 credits, 10 credits, 20 credits, 20 credits, 50 credits, 40 credits, and the repeater symbol's value would be 160 credits. Any repeater symbols that spin up during the ensuing feature game would be set to 160 credits in this example.

In some embodiments, the value of the repeater symbols may change across feature spins: i) at random, ii) according to defined table/order, iii) based upon results of a feature spin, iv) wager level, v) number of initiating feature initiating symbols, vi) number of symbols collected in feature, vii) based upon the combined result of multiple players game events, wager level or other criteria across multiple linked gaming units (i.e. progressive repeater value), and/or viii) any combination of the foregoing.

In some embodiments, the configurable symbols may include mystery symbols whose value is not revealed at the time the mystery symbol is displayed. In an embodiment, the value of a mystery symbol may be determined, e.g., randomly, and any time following its display. The mystery symbol may then be modified to display its determined value.

In some embodiments, mystery symbols may be displayed in connection with play of both the base game and the feature game. Accordingly, in some embodiments, it is possible for a mystery symbol to be part of the defined number of triggering symbols in a base game. For example, a base game result could include a mystery symbol along with five other configurable symbols. In such instance, the value of the mystery symbol may be determined and displayed prior to determining the value of the repeater symbol. If additional mystery symbols are awarded during the assigned value ensuing feature game, the value could be assigned this same value or other values may be separately determined.

In some embodiments, the value of a mystery symbol may be determined and awarded to the player during play of the base game if the base game outcome does not trigger the feature game. For example, assuming 6 configurable symbols are required to trigger a feature game, the appearance of a mystery symbol in a base game outcome with fewer than 6 configurable symbols may result in the award of the determined mystery symbol value to the player even though the feature game would not be triggered.

In some embodiments, the awards assigned to mystery symbols may be selected from a set of awards that includes (1) credit values, e.g., 10 credits, 20 credits, 50 credits, 100 credits, 500 credits, etc., (2) jackpot values, e.g., MINI, MINOR, MAXI, and GRAND, and/or (3) fixed prizes, e.g., cars, electronics, etc. In some embodiments, the awards assigned to mystery symbols during the base and feature games may be selected from the same set of possible awards.

In some other embodiments, different sets of possible awards may be available during the base and feature games. For example, in some embodiments, the mystery symbol awards may be limited to jackpot awards and/or fixed prizes during the base game, while the possible awards during the feature game may also include credit values.

In some embodiments, a first valuation game may be provided to determine the value of the mystery symbols. The first valuation game may be in the form of a first spinning wheel game, where a wheel spins and randomly stops to determine a value for one or more mystery symbols. The wheel may include of a plurality of sections that each display a respective value, such as a numeric value (e.g., a number of credits or currency), or jackpot label (e.g., mini, minor, major maxi, or grand) that is associated with a jackpot amount (e.g., $50, $500, $1,000, $5,000, $10,000). The wheel may, for example, spin vertically or horizontally across a game screen forming part of the slot machine device.

In some embodiments, a single wheel spin may be used to determine the value for any displayed mystery symbols. For example, where the triggering base game outcome has four value symbols and three mystery symbols, the first valuation game is triggered. If the first valuation game results in a value of $100, then each of the three mystery symbols are converted from a question mark symbol to $100.

In other embodiments, the wheel may be separately spun for each displayed mystery symbol. Accordingly, in some embodiments, the example may result in three wheel spins (one for each mystery symbol) during the first valuation game.

In various embodiments, the first valuation game may not display a wheel, but instead may display the values in a different arrangement such as a reel, a grid, etc. In certain embodiments, the first valuation game may not display a wheel, a reel, or values and instead may make a random determination to select one value from a range or group of values and display the selected value and use it for the one or more mystery symbols.

In various embodiments, one or more mystery symbols may be replaced with a sum of the values of symbols displaying a value.

In other embodiments, the value of the mystery symbols may be set in other ways. For example, a random event may cause a value to be set on a mystery symbol. Also, there may be a player skill feature where the skill level of the player is determined or is based on particular data regarding the particular player, and the value of the mystery symbol is set accordingly. Also, pick n' pop may be used to set the value of the mystery symbol.

Also, different levels of mystery symbols may be used, such that some levels are of higher average values than others. For example, blue mystery symbols may use a blue wheel with lower average values and gold mystery symbols may use a gold wheel with higher average values.

The first valuation game may also be used to determine the value of any additional mystery symbols that are collected during the feature game. In some embodiments, the first valuation game may be triggered following any spin that produces one or more new mystery symbols. Alternatively, the first valuation game may be conducted upon completion of the feature game. As discussed above, a single spin may be used to determine the value of all newly awarded mystery symbols. Alternatively, individual spins may be conducted to separately determine the value of each respective mystery symbol.

In some embodiments, an enhanced award may be awarded if the display matrix is completely filled with configurable symbols during the Hold & Spin feature game. For example, in some embodiments, the enhanced award may be a multiplier, such as a 2× or 3× multiplier of the "hold" symbols, or an award of a jackpot value.

In some embodiments, the enhanced award may be determined using a second valuation game. The second valuation game may be a second spinning wheel game that provides different and/or enhanced values from those used in the first spinning wheel game. For example, the second spinning wheel game may include multipliers (i.e. 2× or 3×) or multipliers with jackpots (i.e. 2×+Grand or 3×+Major). The multiplier value indicated by the spin of the second display wheel affects the sum total value of all "hold" configurable symbols collected in the Hold & Spin game (i.e. "2×" will double the sum total value); the jackpot enhances the Hold & Spin award by the amount of the jackpot (i.e. $50, $500 or $5000 will be added to the sum total value).

In some embodiments, the feature game may provide multiple game instances, i.e., multiple symbol matrices. In some embodiments, multiple game instances may be provided only when a second trigger condition occurs in connection with the triggering of the feature game. In some embodiments the second triggering condition may be an ante bet, which is placed in addition to the base game wager. In some embodiments, the number of additional game instances in the feature game is dependent on the size of the ante bet. For example, a first ante bet may result in two game instances, a second, larger ante bet may provide three game instances, etc.

In some embodiments the ante bet is placed prior to play of the base game. In other embodiments, the option to place the ante bet may be made available at other times, such as upon triggering the feature game.

In at least some embodiments, the multiple game instances are played independently from one another. For example, in the context of a hold and spin feature game, each of the game instances may consist of a respective set of reels that spin independently of the reels in the other game instance(s). In at least some embodiments, the game instances are played simultaneously. For example, in the context of a hold and spin feature game, the reels in all of the matrices may be spun at the same time in a given round. In other embodiments, the game instances may be played sequentially during the feature game.

In various embodiments, the additional game instances replicate at least some of the symbols from the base game outcome that triggered the feature game. In certain embodiments, the additional game instances initially replicate at least some of the configurable symbols that triggered the feature game. In some embodiments, the additional game instances replicate all of the configurable symbols that triggered the feature game.

In embodiments where the feature game is a hold and spin feature game, an ante bet may entitle the player to multiple game instances upon the feature game being triggered. For example, the ante bet may result in one or more additional game instances (i.e., display matrix) that each initially include at least some of the configurable symbols that triggered the feature game. In certain embodiments, the triggering base game outcome is fully replicated such that the hold and spin feature begins with at least two identical display matrices that may be played independently during the hold and spin feature game. In particular, separately for each game instance, the configurable symbols in a respective game instance are held in place while any non-configurable symbols are replaced with a symbol selected from the set of configurable and non-configurable symbols.

In some embodiments, the game may replicate and re-replicate any number of times (i.e. 1 game replicates 2 times and then another 3 times) according to the same or varied triggering conditions. For example, a base game replicates one time upon the appearance of any six or more scatter symbols and, as a result, provide two independent games. Each of these two games may then replicate again upon the appearance of any one or more special scatter symbols. This re-replication process may occur indefinitely or cease upon reaching a predetermined number of games.

In some embodiments, the game may include any number or type of symbol from the original game in the replicated game(s) (e.g., only replicates the highest value symbols).

In some embodiments, the base and replicated games may play independently (as illustrated in prior embodiments) or dependently (i.e. only plays the first replicated game if the base game collects 12 or more held symbols).

In some embodiments, the game may include award enhancements for any or all of the games played (i.e. the original game pays 2×, the first replicated game pays 3×, the second replicated games pays 4×).

BRIEF DESCRIPTION OF THE DRAWINGS

Features and advantages of certain embodiments of the present invention will become apparent from the following description of embodiments thereof, by way of example only, with reference to the accompanying drawings, in which;

FIGS. 6A to 6C are screenshots of an embodiment of the feature game of FIG. 4;

Figure 1:
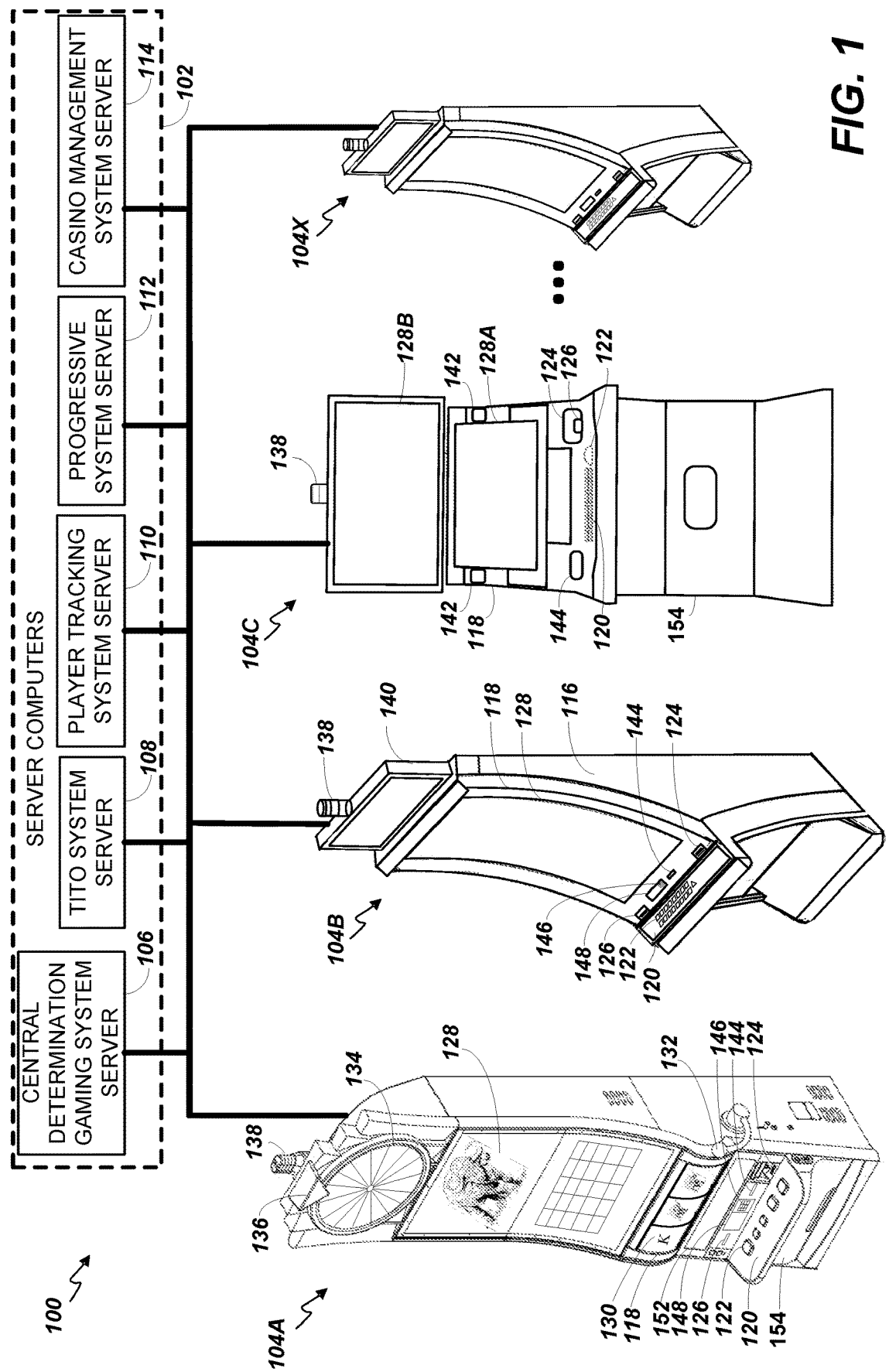
FIG. 1 is an exemplary diagram showing several EGMs networked with various gaming related servers.

The foregoing summary, as well as the following detailed description of certain embodiments of the present invention, will be better understood when read in conjunction with the appended drawings. For the purpose of illustrating the invention, certain embodiments are shown in the drawings.

It should be understood, however, that the present invention is not limited to the arrangements and instrumentality shown in the attached drawings.

DETAILED DESCRIPTION

Referring to the drawings, there are shown example embodiments of gaming machines having components which enable the implementation of a base game from which a Hold & Spin feature game may be triggered.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over a network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a RELM XL™ model gaming device manufactured by Aristocrat® Technologies, Inc. As shown, gaming device 104A is a reel machine having a gaming display area 127 comprising a number (typically 3 or 5) of mechanical reels 130 with various symbols displayed on them. The reels 130 are independently spun and stopped to show a set of symbols within the gaming display area 127 which may be used to determine an outcome to the game.

In many configurations, the gaming device 104A may have a main display 128 (e.g., video display monitor) mounted to, or above, the gaming display area 127. The main display 128 can be of a variety type, e.g., high-resolution LCD, plasma, LED, or OLED panel which may be flat or curved as shown, a cathode ray tube, or other conventional electronically controlled video monitor. The main display 128 may be of one or more various orientations (i.e., landscape or portrait), aspect ratios and resolutions.

In some embodiments, the bill validator 124 may also function as a "ticket-in" reader that allows the player to use a casino-issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller (not shown in FIG. 1) within the gaming device 104A can communicate with the player tracking system server 110 to send and receive player tracking information.

Gaming device 104A may also include a bonus topper wheel 134. When a bonus play is triggered (e.g., by a player achieving a particular outcome or set of outcomes in the primary game), bonus topper wheel 134 is operative to spin and stop with indicator arrow 136 indicating the outcome of the feature game. Bonus topper wheel 134 is typically used to play a bonus game, but it could also be incorporated into play of a base or a primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
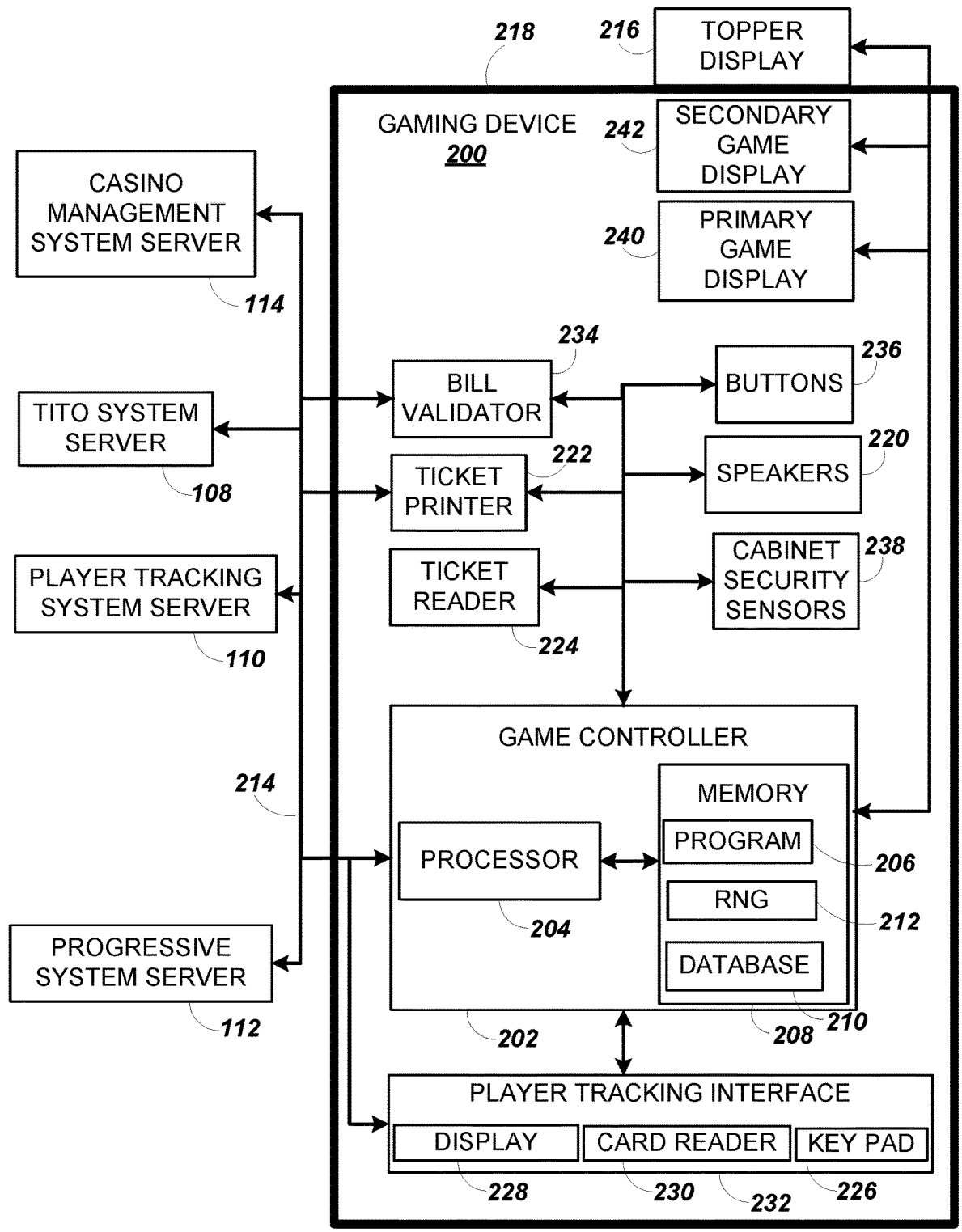
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that, where possible, reference numerals identifying similar features of the gaming device 104A embodiment are also identified in the gaming device 104B embodiment using the same reference numbers. Gaming device 104B does not include physical reels, but instead shows game play functions, such as virtual reels, on main display 128. An optional topper screen 140 may be used as a secondary or additional game display for bonus play to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The door 154 may also be accessed to reset the machine, verify and/or upgrade the software, and for general maintenance operations.

Another example of gaming device 104C shown is the Helix™ model gaming device manufactured by Aristocrat® Technologies, Inc. Gaming device 104C includes a main display 128A that is in a landscape orientation. Although not illustrated by the front view provided, the landscape-style main display 128A may have a curvature radius from top to bottom, or alternatively from side to side. In some embodiments, main display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3 gaming environments, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but shown in FIG. 1). The game instance is communicated to gaming device 200 via a network 214 and then displayed on gaming device 200. Gaming device 200 may execute game software, such as, but not limited to, video streaming software that allows the game to be displayed on gaming device 200. When a game is stored on gaming device 200, it may be loaded from the memory 208 (e.g., from a read only memory (ROM)) or from the central determination gaming system server 106 to memory 208. The memory 208 may include random access memory (RAM), read only memory (ROM) or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices 200, such as gaming devices 104A-104X, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming device 200 is not simple or straightforward because of: 1) the regulatory requirements for gaming device 200, 2) the harsh environment in which gaming device 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and the secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using a player interface, such as the player input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash-out button to receive a ticket from the ticket printer 222). The ticket may be "cashed-in" for money or inserted into another machine to establish a credit balance for play.

While an example gaming device 200 has been described in regard to FIG. 2, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming device 200. In particular, the gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select, from the list, a game that they wish to play.

Figure 3:
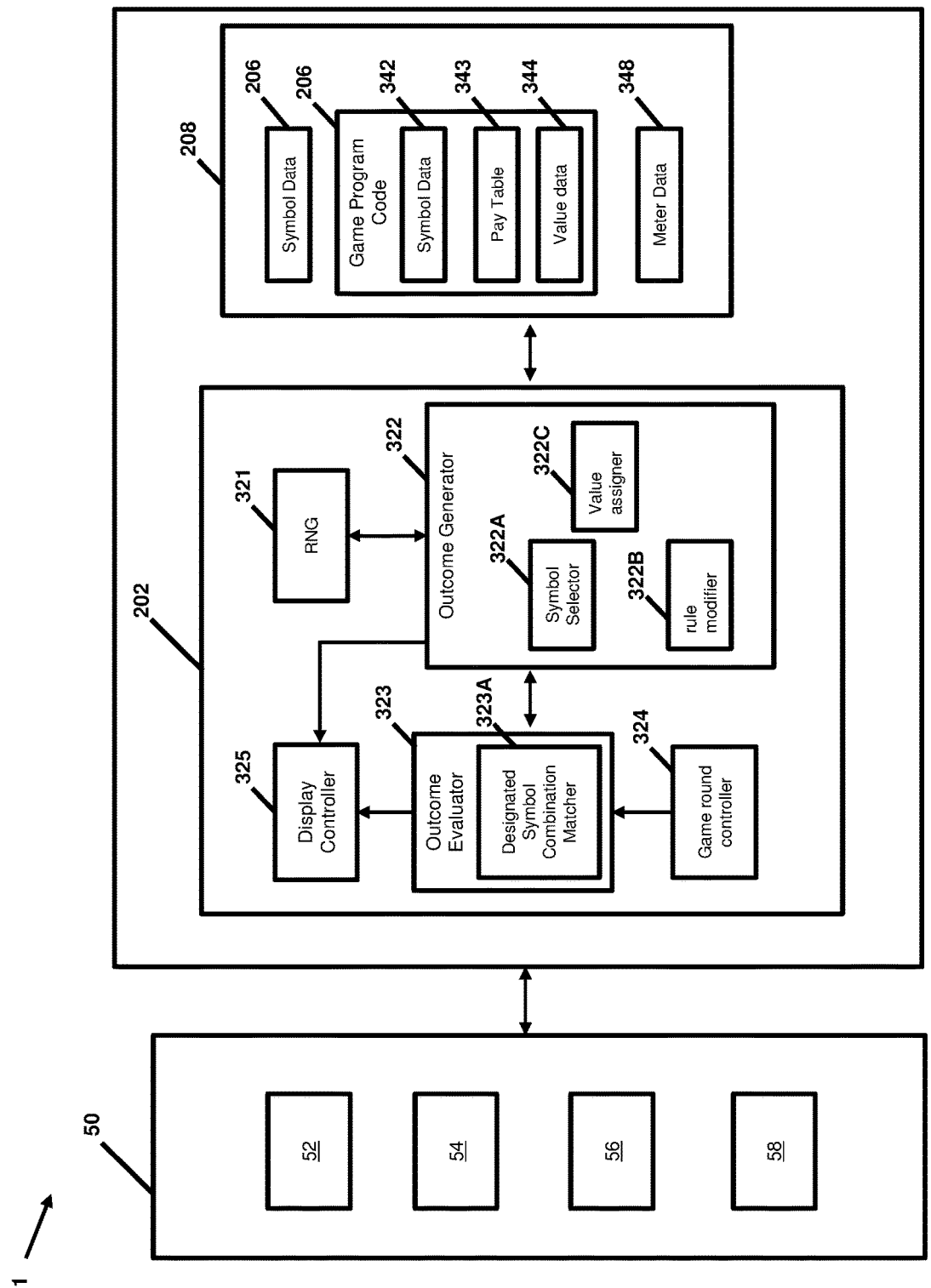
FIG. 3 is a further block diagram showing various functional elements of an embodiment of the game controller of FIG. 2.

In FIG. 3, the processor 204 of game controller 202 of gaming device 200 is shown implementing a number of modules based on game program code 206 stored in memory 208. Persons skilled in the art will appreciate that several of the modules could be implemented in some other way, for example, by a dedicated circuit.

These modules include an outcome generator 322 which operates in response to the player's operation of player input buttons 236 to place a wager and initiate a play of the game and generates a game outcome which will then be evaluated by outcome evaluator 323. The first part of forming the game outcome is for a symbol selector 322A to select symbols from a set of symbols specified by symbol data 342 using a random number generator 321. The selected symbols are advised to the display controller 325 which causes them to be displayed as a symbol display on primary game display 240 at a set of display positions.

In certain embodiments, the symbol data 342 includes one or more virtual reels that correspond to one or more reels displayed by the primary game display 240. The virtual reels include an arrangement of symbols selected from symbol data 342 in, for example, a predetermined or random manner. The symbol selector 322A selects a stop position for the one or more virtual reels based on one or more outcomes of the random number generator 321. The stop position of the one or more reels then determines the symbols that are selected on the primary game display 240.

In the embodiment described below, the display positions of the symbol display are arranged in a rectangular matrix comprising a plurality of columns and a plurality of rows. However, other arrangements known in the gaming industry could be employed in embodiments of the disclosure. For example, in some arrangements, there are more symbols in some columns than in others, such as 3-4-3-4-3 arrangement of seventeen display positions corresponding to respective ones of five reels. In such arrangements, the columns of four symbols can be arranged so that they are off-set or staggered relative to the columns having two symbols so that the middle two symbols in the columns of four symbols share boundaries with two symbols of each neighboring reel.

Figure 4:
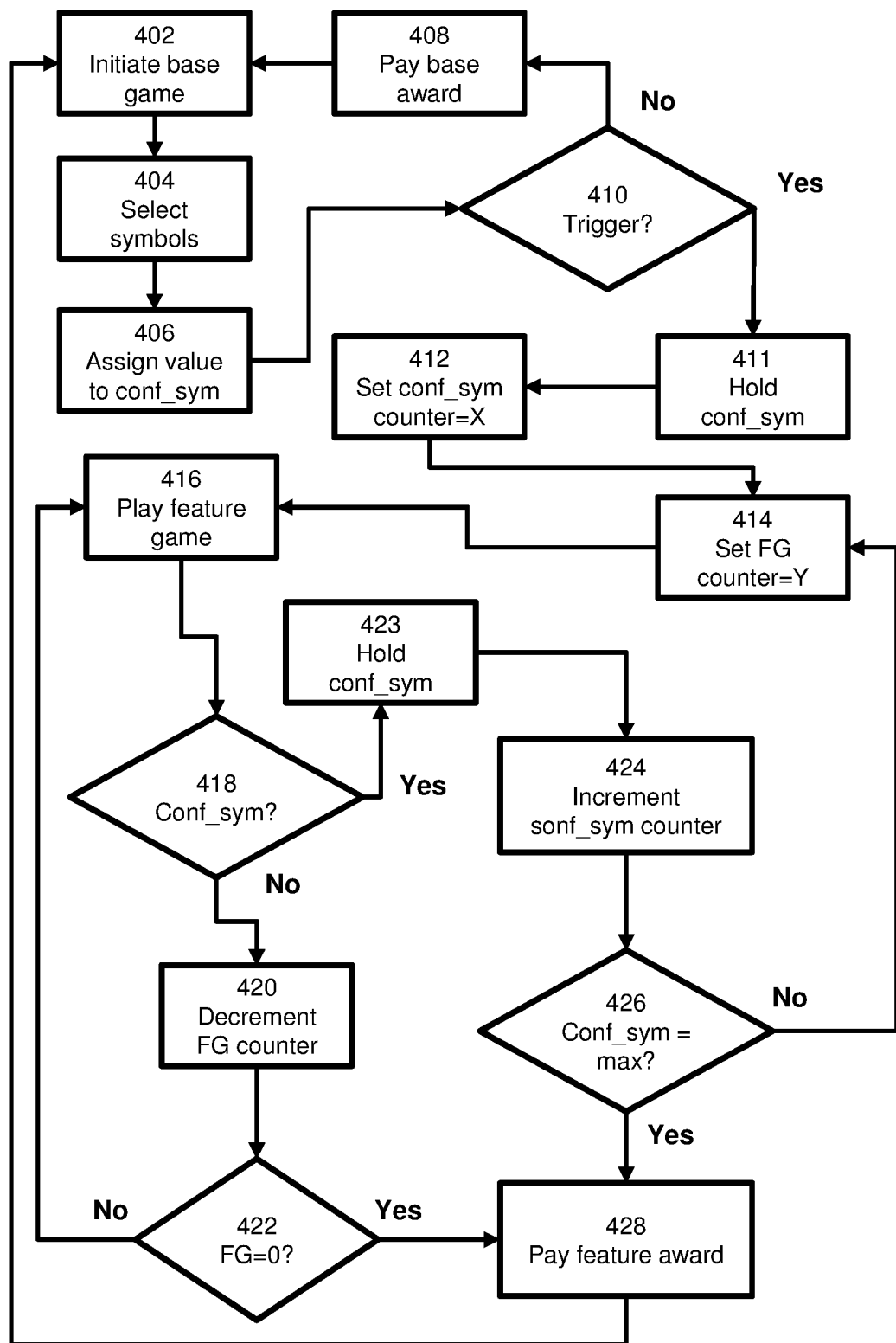
FIG. 4 is a flow diagram for an example embodiment of a process for operating the EGM of FIG. 2 in accordance with various aspects of the present disclosure.

FIG. 4 shows a flow diagram of one embodiment in which a feature game may be triggered from play of the base game at step 402. In this embodiment, the base game comprises using symbol selector 422A to select a plurality of symbols from a set of symbols to display at the respective display positions arranged on primary game display 240 at step 404. The set of symbols, which are stored as symbol data 342 in memory 208, comprises a plurality of configurable symbols and non-configurable symbols.

Figure 7A:
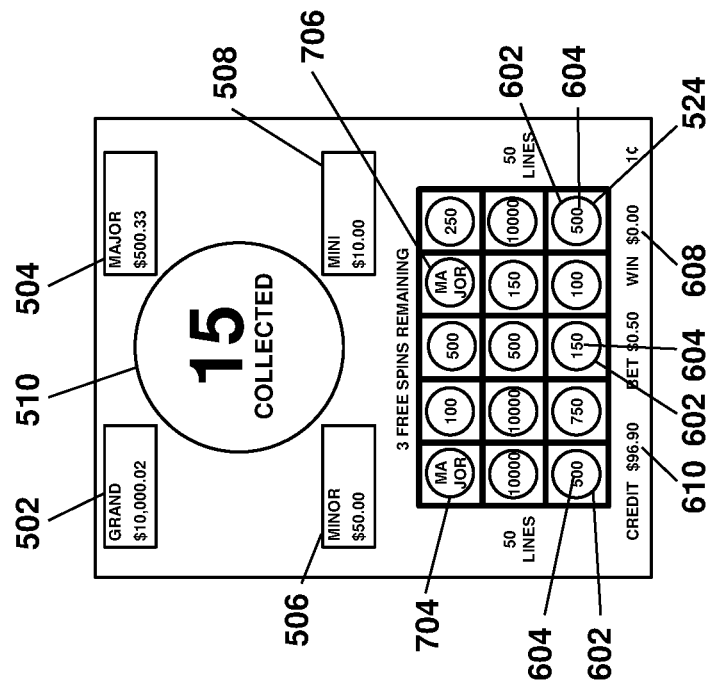
FIGS. 7A and 7B are screenshots of an embodiment of the feature game of FIG. 4, showing one of the progressive jackpots being awarded.
Figure 7B:
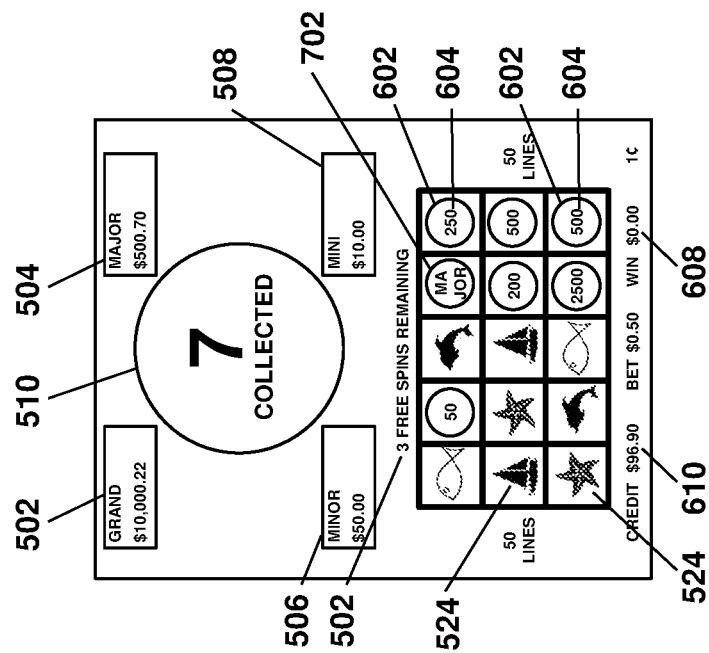

In an embodiment, the configurable symbols each comprise at least a common component and at least a variable component. The variable component is indicative of a value of a prize that is associated with each of the configurable symbols. An example of a configurable symbol is shown in FIGS. 6A-6C in the form of a pearl symbol. The common component is the pearl itself 602, while the variable component is the indicia 604 overlaying pearl 602. In this case, indicia are numerals directly indicative of the value of the prize. In other embodiments, as shown in FIGS. 7A-7B, the indicia indirectly indicate the value of the prize, such as "major" indicia 702, "minor" indicia 704 or "mini" indicia 706. It will be appreciated that the indicia can also be in other forms which may also be indicative of a prize. For example, the car icon indicates that the player has the opportunity to, or has, won a car. In some embodiments, the indicia may indicate only a portion of a prize. Continuing with the car example, the car icon may be split into four portions, each portion being assigned to a different configurable symbol. In such embodiments, all four portions of the car icon are required to be selected for display in order for the car prize to be won.

In one embodiment, at least one value of the respective prizes is generated by randomly selecting one of a plurality of defined multipliers that is applied to an amount wagered on the base game from which the feature is game triggered. This is accomplished at step 406 using value assigner 322C, which selects the predefined multipliers from value data 344 using a value obtained from the random number generator (RNG) 321, applies the multiplier to the initial wager to obtain a prize value and assigns the prize value to each of the configurable symbols selected by symbol selector 322A. The plurality of defined multipliers in this embodiment is selected at random according to a weighted probability based at least in part on the amount wagered on the base game. That is, the value assigner 322C obtains a value from RNG 321 and uses this to determine from the weighted table which value to assign to a configurable symbol. In an embodiment, the assignment of values to the configurable symbols is performed by the value assigner 322C after the symbols have been selected and the game controller knows they will be displayed but before they are displayed on the display. In another embodiment, the assignment occurs after the symbols have been displayed on display 240. In an embodiment, values are assigned to all configurable symbols irrespective of whether they will be displayed.

In this or other embodiments, at least one value of the respective prizes may comprise a defined value and/or a jackpot. As used herein, the term "jackpot," as opposed to "prize," refers to a progressive prize which accumulates over multiple plays of the base game and/or the feature game. As will be appreciated, the jackpot may be funded from a variety of sources including from only the gaming machine 200 itself, or from a plurality of gaming devices 200—a so-called "link". Furthermore, the jackpot may be triggered by any means known in the art, such as by using a mystery trigger or by using the Hyperlink™ system developed by the applicant.

In another embodiment, the variable prizes may be randomly selected under the control of value assigner 322C from a set of available prizes. Specific prizes may be weighted so as to control the probability of certain prizes occurring. In some embodiments, there may be a plurality of sets of prizes and the value assigner 322C may be configured to choose the set of prizes from which values will be randomly selected on the basis of a player's wager in the base game.

Returning to FIG. 4, at step 410, outcome evaluator 323 monitors play of the base game and determines whether a trigger event has occurred. In this embodiment, a trigger event occurs when six configurable symbols appear on primary game display 240. If a trigger event has not occurred, play of the base game continues and control reverts to step 402 once any awards are paid at step 408. However, if a trigger event does occur, the feature game initiates by first holding the configurable symbols in their respective display positions 524 at step 411. Outcome generator 322 causes the feature game to be displayed on display 240 by retrieving symbol data 342 from memory 208 and passing the data to display controller 325 which controls display 240 to display the feature game. In other embodiments, more than or less than six symbols will be required to trigger the feature game or the feature game will be modified in a way that is proportional to the number of configurable symbols that are displayed to trigger the feature game. For example, the average or total prize achievable in the feature game may be increased in proportion to the number of configurable symbols appearing.

Figure 5:
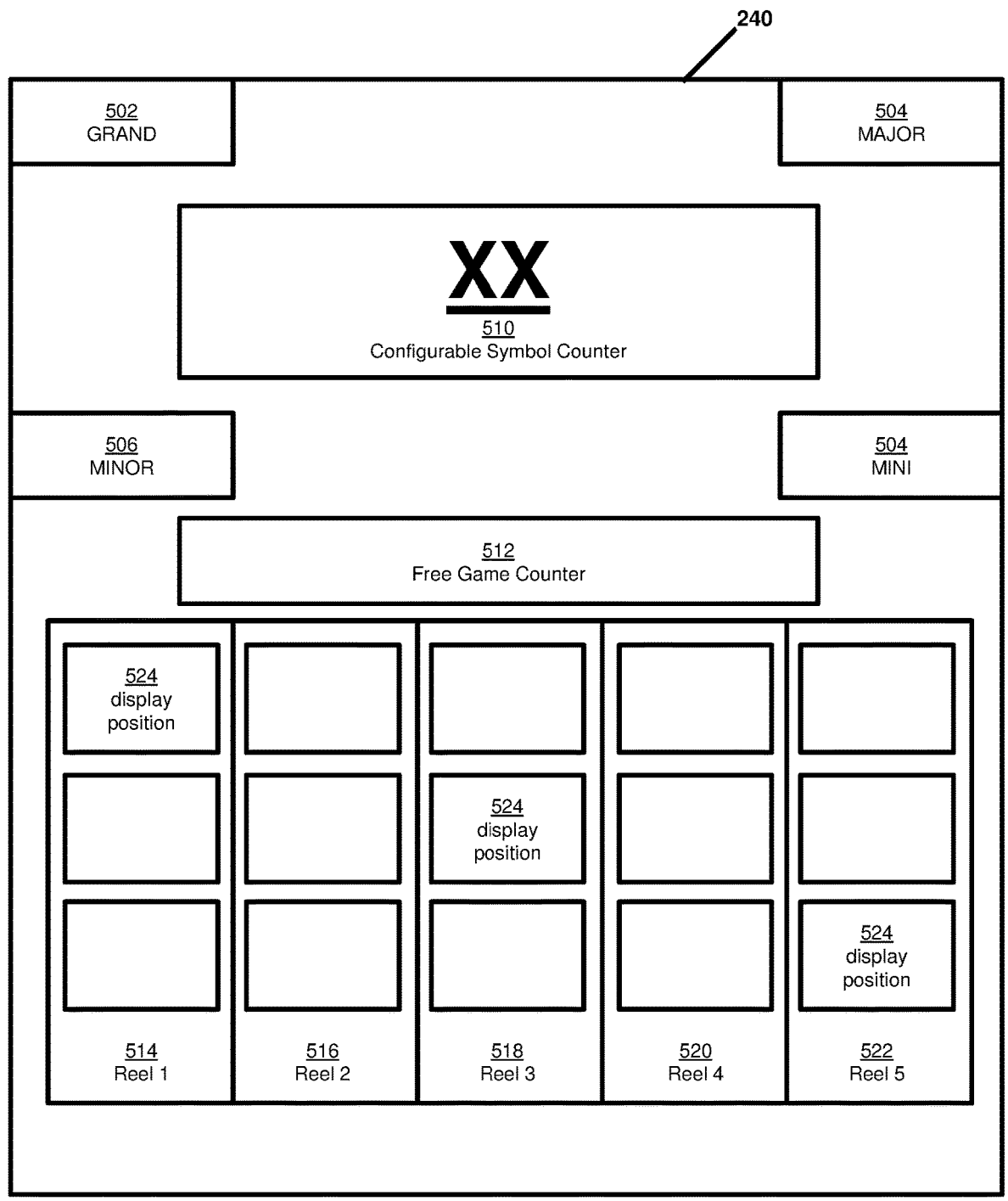
FIG. 5 is a representation of an exemplary screen of the feature game of FIG. 4.

When the feature game starts, in various embodiments, the configurable symbol counter 510 of FIG. 5 is set to the number of configurable symbols that are held on reels 514-522 at step 412. In the preferred embodiment, this is also the number of configurable symbols which originally triggered the feature game. That is, in this embodiment, the configurable symbol counter 510 is initially set to 6, as six configurable symbols trigger the feature game. Alternatively, for example, if seven configurable symbols are selected for display, but only six are required for triggering the feature game, the configurable symbol counter 510 may be initially set to seven.

Once configurable symbol counter 510 is set, control moves to step 414 (FIG. 4) which sets free game counter 512 to the defined number of free games. In an embodiment, the preferred number of free games is three, so free game counter 512 is set to three. In other embodiments, the number of free games may be more than or less than three, or may be derived by the game controller from the number of configurable symbols that appear. For example, an additional free game may be offered for each configurable symbol that appears in addition to a predefined minimum (for example, six) required to trigger the feature game.

Then, similar to the base game, the symbol selector 322A selects symbols from symbol data 342 to be displayed in the other display positions 524 not already displaying a configurable symbol via display controller 325 at step 416. Note that in certain embodiments, symbols in the feature game are selected from the full set of symbols defined by symbol data 342, including any configurable symbols. In other embodiments, the symbols may be selected from a reduced set of symbols taking into account any configurable symbols already held. For example, in one or more embodiments, only value symbols and blank symbols, i.e., a reel strip position not having any symbol, may be used by the symbol selector 322A. In an alternative embodiment, the symbols may be selected from an increased set of symbols. For example, symbols may be purchased or otherwise awarded for addition to the reel strip prior to initiating the feature game. If one or more configurable symbols are selected, value assigner 322C assigns randomly selected values to each configurable symbol.

Outcome evaluator 323 then monitors play of the feature game to determine whether a configurable symbol is selected and displayed at step 418. If a configurable symbol is not displayed, free game counter 512 is decremented by a defined amount, such as one, at step 420. In other embodiments, the free game counter 512 is decremented by an amount, such as one, regardless of whether a configurable symbol is displayed.

If there are a number of free games remaining as determined by controller 202 at step 422, control returns to step 416 to continue the feature game. On the other hand, once the number of free games is depleted, that is, when the free game counter 512 reaches zero, the feature game ends and control returns to step 402 after any prizes are paid at step 428. In one embodiment, the accumulated value of all the individual prizes as indicated by the variable components of the collected configurable symbol is paid at step 428.

Returning to step 418, if outcome evaluator 323 determines that at least one configurable symbol is displayed on reels 514-522, then that symbol is held on the reel, at step 423, and the configurable symbol counter 510 is incremented at step 424. Outcome evaluator 323 then checks whether a defined number of configurable symbols has been displayed on reels 514-522 at step 426 and, if the defined number has been reached, a jackpot is paid at step 428.

The defined number of configurable symbols required to trigger a jackpot in certain embodiments is fifteen. That is, in certain embodiments in which a game is implemented using a 5×3 matrix, configurable symbols must be selected and displayed in all the matrix positions of reels 514-522. In other embodiments, the defined number may be more than or less than fifteen. For example, in a 3-4-3-4-3 matrix configuration as discussed above, the number of configurable symbols required to fill all matrix positions would be 17. In yet other embodiments, not all of the matrix positions need to necessarily be filled, and the number of configurable symbols required may be determined randomly.

In the above embodiments, the feature game ends when the Grand jackpot 502 is triggered at step 426. In other embodiments, the feature game does not necessarily end at this point. In such embodiments, one or more of reels 514-522 are configured to expand and display additional configurable or non-configurable symbols when configurable symbol counter 510 reaches the defined number. For example, a game implemented using a 5×3 matrix may expand to a different configuration such as a 3-4-3-4-3 configuration. In such embodiments, a prize in addition to the Grand jackpot 502 is paid if configurable symbols are also selected for display in those additional positions.

Alternatively, if outcome evaluator 323 determines that the defined number of configurable symbols has not been reached at step 426, the feature game continues. In the embodiment of FIG. 4, each time a configurable symbol is displayed and the jackpot is not won, free game counter 512 is reset to the initial quantity by returning control to step 414, which in this embodiment is three as noted above. Therefore, the number of free games awarded by the outcome evaluator 323 is indefinite and is not determined by a defined limit.

In this or other embodiments, if no configurable symbols appear on reels 514-522 in any of the free games initially awarded, free games counter 512 is reset. Such embodiments ensure the player is guaranteed to win a prize over and above the prize payable for triggering the feature game.

In the above embodiments, the jackpot paid in response to configurable symbol counter 510 reaching the defined threshold is Grand prize 502. The Grand prize in this embodiment is a linked jackpot which receives contributions from a plurality of linked gaming machines and incremented based on the turnover of the linked machines. A linked jackpot may be a single site progressive (SSP), a multiple site progressive (MSP) or a wide area progressive (WAP). In some embodiments, a lower threshold of configurable symbols may be required for Major prize 504, Minor prize 506 or Mini prize 508 to be won. Alternatively or additionally, as best shown in FIGS. 7A and 7B, Major, Minor and Mini prizes may be paid by assignment of those prizes to one of the configurable symbols, such as "major" indicia 702, "minor" indicia 704 or "mini" indicia 706.

Note that in some embodiments, one or all of the Grand prize 502, Major prize 504, Minor prize 506 and Mini prize 508 may all be implemented as jackpots, as fixed bonus amounts that do not increment or as a mixture of both. In the embodiment of FIGS. 6A to 7B, as noted above, Grand prize 502 is implemented as a linked progressive jackpot, while Major prize 504 is implemented as a stand-alone progressive (SAP) jackpot which only takes contributions from the gaming machine itself, incrementing the jackpot as a function of turnover. Minor prize 506 and Mini prize 508 are implemented as fixed bonus amounts in proportion to the initial bet wagered. In some embodiments, Grand prize 502 may also be implemented as a SAP or the Major prize 504 may also be implemented as a linked jackpot.

This embodiment implements Grand prize 502 and Major prize 504 as jackpots and, while both may be awarded simultaneously, neither can be awarded more than once in the same feature game. However, in other embodiments, either jackpot may be won multiple times within the same feature game. In such embodiments, players are awarded a seed value (i.e. reset value) of the jackpot for subsequent triggers of that same jackpot.

As embodiments of the feature game described above automatically adjust awards based on turnover and proportionality to the initial wager, this invention is particularly suited to variable denomination games. Therefore, in some embodiments, controller 202 allows player selection of the minimum bet denomination. For example, before play of the game, controller 202 causes display controller 325 to output a message on display 240 requesting the player to select a minimum bet denomination. The player makes a selection through the game play mechanism 56 in response to which controller 202 adjusts the amount contributed to Grand prize 502 and Major prize 504 and the magnitude of Minor prize 506 and Mini prize 508. Controller 202 also adjusts the weightings of the values in value data 344 from which value assigner 322C may assign to the configurable symbols. In one embodiment, there are four denominations available for selection, 1 c, 2 c, 5 c and 10 c. Those skilled in the art would appreciate that the denominations are not limited to four, but can include any suitable amount in any given currency. Note also that in this embodiment, while the selected denomination affects the magnitude of the Minor prize 506 and Mini prize 508, it does not affect the magnitude of the Grand prize 502 and Major prize 504.

Examples

More specific examples of embodiments of the present disclosure are now described with reference to FIGS. 6A to 7B. In general, as shown in these Figures, the embodiment has a traditional 3×5 grid layout, and is referred to in the examples below as the "Hold & Spin" feature.

Referring to FIG. 6A, the Hold & Spin feature is triggered when six (6) pearl symbols 602 are selected for display. When triggered, pearls 602 are held in their respective display positions, being all of column 1, column 2 rows 1 and 2 and column 5 row 1, and the controller 202 waits for a player instruction to initiate the game through player input buttons 236. In some embodiments, controller 202 will wait indefinitely while in other embodiments, controller 202 will wait for a predefined period of time before automatically initiating the game.

At this point, configurable symbol counter 510 is set to 6, and the player is guaranteed to win the accumulated value as indicated by the indicia 604 of the six pearls 602. That is, even before play of Hold & Spin starts, the player has won 4,300 credits in the embodiment of FIG. 6A.

Moving on to FIG. 6B, the player has spun an additional four (4) pearls 602. Accordingly, configurable symbol counter 510 is incremented from 6 to 10 and free games counter 512 is reset to the initial quantity, which is 3 feature games in this embodiment. As compared to FIG. 6A, the additional pearls 602 are selected for display at display positions C2R3, C3R1, C4R3 and C5R2, and are also held at those positions for the subsequent games. In various embodiments, instead of resetting the free games counter to the initial quantity, the free games counter is decremented by one for every spin that does not result in additional configurable symbols being displayed, and does not decrement by one when additional configurable symbols are displayed.

Over the remaining feature games, the player spins only an additional one (1) pearl 602, displayed at C4R1, as shown in FIG. 6C. Accordingly, the free games end and the player wins the accumulated value of the values indicated on pearls 602. In this case, the total award is the 4,300 credits for the six (6) pearls 602 that originally triggered the Hold & Spin game, plus the additional five (5) pearls 602 selected during play of the Hold & Spin game—5,800 credits. In this embodiment, the accumulated award is totaled at the end of the Hold & Spin game and first transferred to the win meter 608 before being transferred to the credit meter 610 by the controller 202. Meter data 348 is adjusted accordingly before the next game can be initiated at step 402. In alternative embodiments, the accumulated award may bypass the win meter and be credited directly to the credit meter.

FIGS. 7A and 7B are examples showing the jackpots being won. In FIG. 7A, value assigner 322C has assigned "Major" indicia 702 to pearl 602, which has been selected for display at C4R1. This triggers Major prize 504 which, in one embodiment, is paid directly into credit meter 610 rather than first into win meter 608. That is, jackpot wins may be paid immediately when they are won rather than being accumulated at the end of the Hold & Spin game as per the other prizes described above. Thus in the FIG. 7A embodiment, Major jackpot 504 is paid when the associated pearl 602 is selected, while the remaining 4,000 credits will be accumulated and paid at the completion of the feature game, in addition to any new pearls 602 that are selected and displayed in the remaining free games. In alternative embodiments, the Major jackpot may be accumulated at the end of the feature game along with the other 4,000 credits, and the accumulated total may be paid first into win meter 608 or directly into credit meter 610.

FIG. 7B shows Grand jackpot 502 being triggered, as fifteen (15) pearls 602 have been selected for display in the matrix by the end of the feature game. Again, the Grand prize 502 is first accounted for and paid directly into credit meter 610, and the remaining prizes indicated by indicia 604 on pearls 602 are then accumulated and paid into win meter 608 before being transferred to credit meter 610. Therefore, in this FIG. 7B embodiment, the total winnings is made up of the initial Grand jackpot 502, plus 63,000 credits indicated by indicia 604 and Minor prize 506 and Mini prize 508 indicated by "Minor" indicia 704 and "Mini" indicia 706. Again, in alternative embodiments, the Grand jackpot may be accumulated at the end of the feature game along with the other 63,000 credits, Minor prize 506 and Mini prize 508, and the accumulated total may be paid first into win meter 608 or directly into credit meter 610. In various embodiments, since all available symbol display positions display the configurable symbols, i.e., pearls, at the end of the feature game, an additional prize such as a multiplier may be applied. The multiplier may be predetermined, such as a 2× multiplier, or randomly determined.

In another example, the configurable symbols may only be provided during part of the game, such as a feature game. In another example, after a feature game is triggered, the game controller 202 initiates a feature game using different reels to those used in the base game. Depending on the embodiment, the trigger may be the configurable symbol trigger described above or some other trigger, e.g., a symbol combination. In this example, in the feature game, individual reels are associated with each of the symbol display positions. That is, if there are fifteen symbol display positions, fifteen reels are used. Each of the reels comprises a mixture of non-configurable symbols and configurable symbols. Before the free games, the configurable symbol counter is set to zero and none of the configurable symbols that trigger the free game are held over to the free game. In the first free game, the symbol selector determines stopping positions for all of the reels. If any of the reels are stopped with a configurable symbol in place, that configurable symbol is held in position by holding/locking the reel (i.e. not spinning the reels in a subsequent free game). That is, in subsequent free games, only the reels corresponding to symbol positions where a configurable symbol has not been displayed are re-spun. Each configurable symbol is assigned a value by value assigner by selecting a prize value from a set of prize values. The set of prize values from which values are selected depends on the player's wager in the base game. As in the example, described above, a player is awarded the sum of the values of the configurable symbols at the end of the free games and may be awarded an additional prize such as a jackpot prize depending on what value the counter reaches during the free games.

In various embodiments, the prize value of each of the configurable symbols is predetermined on the basis of a selected wager amount and/or selected denomination value. In various embodiments, the prize value of each of the configurable symbols is determined by the game controller 202 in response to a wager. In certain of these embodiments, the prize value may be determined on the basis of the selected wager amount and/or selected denomination.

In another example, the configurable symbol may have an alternative visual representation, for example, a door which opens once the configurable symbol is displayed in a display position to reveal the assigned prize value.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further, different parts of the program code can be executed by different devices, for example in a client server relationship. Persons skilled in the art will appreciate that program code provides a series of instructions executable by the processor.

Repeater Symbols & Mystery Symbols

FIGS. 8A to 8M are screen shots of a display, such as the primary game display 240, at different phases during play of a base game and an ensuing feature game according to an embodiment of the present disclosure. Instead of a pearl as described above, the configurable symbol in this embodiment is illustrated as a rectangle overlying a diamond. As will be appreciated, the configurable symbols can take a variety of other forms in accordance with the theme of the underlying game.

Figure 8A:
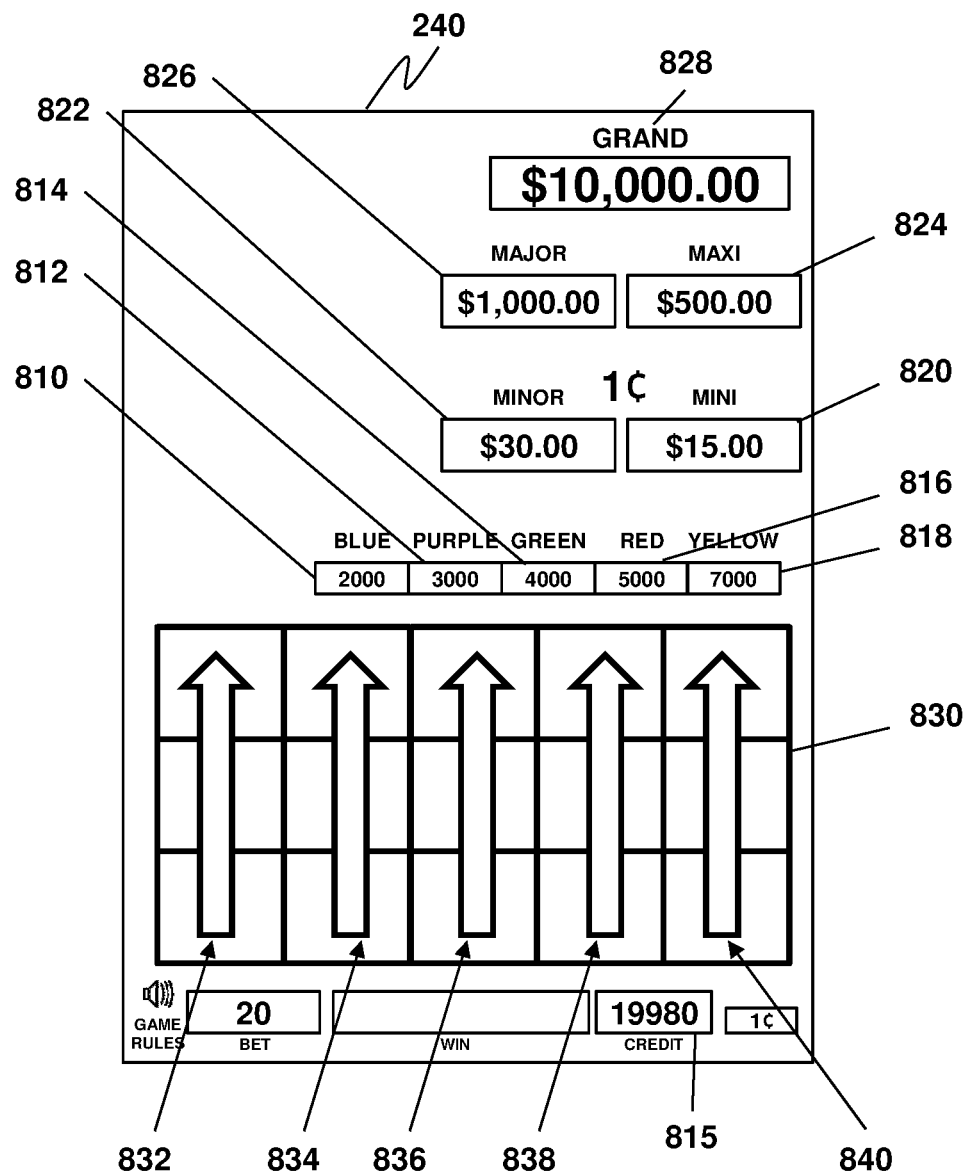
FIGS. 8A to 8M are screen shots of another embodiment of a feature game.
Figure 8B:
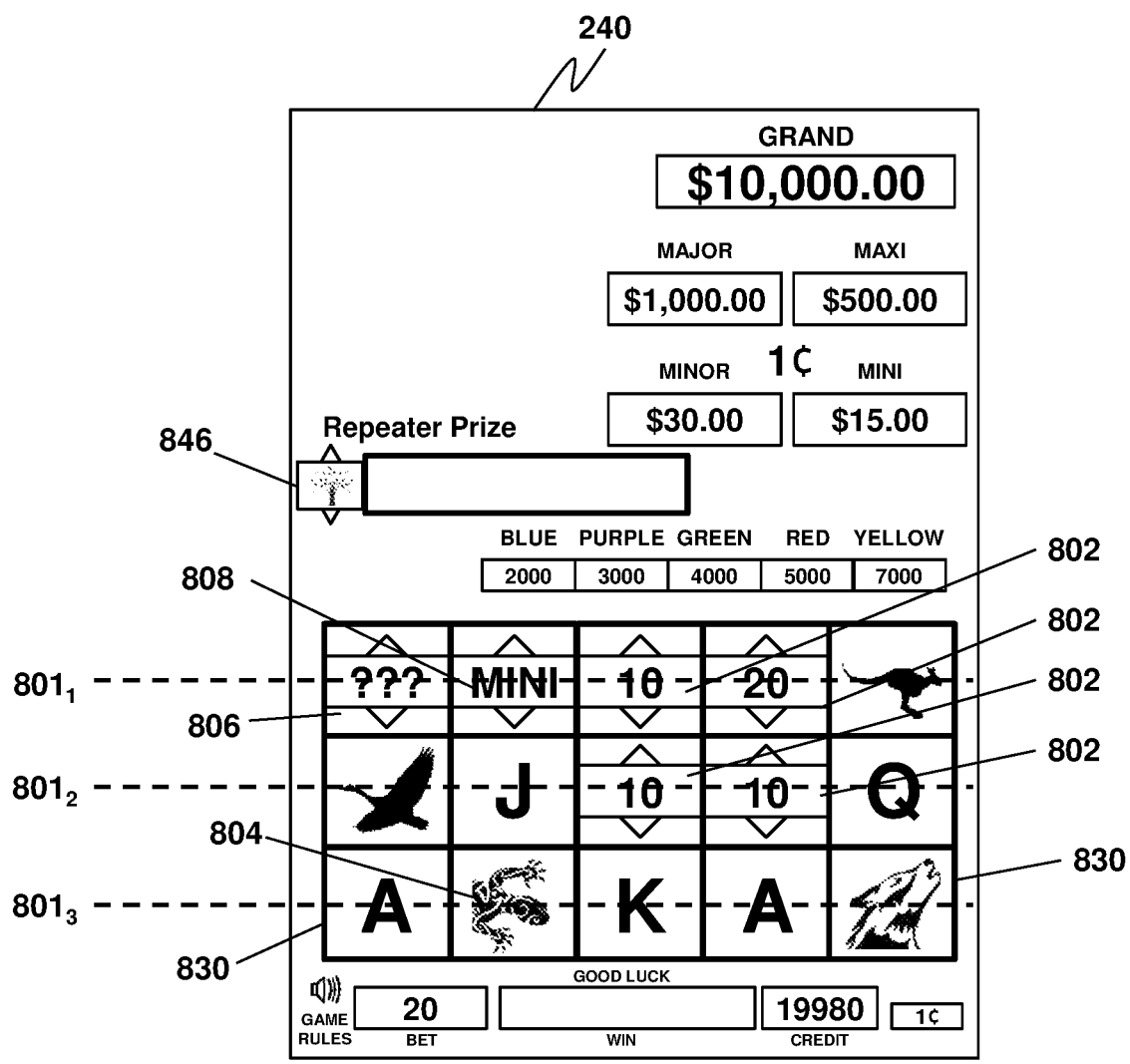

In this embodiment, there may be multiple types of configurable symbols, including value symbols 802 (see, e.g., FIG. 8B), repeater symbols 804 (see, e.g., FIG. 8H), mystery symbols 806 (see, e.g., FIG. 8B), and jackpot symbols 808 (see, e.g., FIG. 8B). Each value symbol 802 displays a numeric value, e.g., a number of credits or currency. The repeater symbol 804 and mystery symbol 806 each display a respective generic symbol but no associated value. In the illustrated embodiment, the repeater symbol 804 displays a tree and the mystery symbol 806 displays question marks. Each jackpot symbol 808 displays the name of a particular jackpot, e.g., a MINI jackpot 820, MINOR jackpot 822, MAXI jackpot 824, MAJOR jackpot 826 or GRAND jackpot 828.

In various embodiments, there may be different levels of the configurable symbol that allow a player to play for different payout levels, for example. The illustrated embodiment, for example, includes 5 different levels of configurable symbols that are designated by different colored configurable symbols, namely, blue configurable symbols 810, purple configurable symbols 812, green configurable symbols 814, red configurable symbols 816, and gold configurable symbols 818.

The color level that is played during a game may be selected based on a player input, such as a betting denomination or an ante bet. In an embodiment, the player places a base bet and in addition may make an ante bet, where the amount of the ante bet entitles the player to increased values on the value symbols and/or different levels of configurable symbols. In the illustrated embodiment, there are five different ante bets where each is associated with a different colored configurable symbol. Larger ante bets entitle the player to configurable symbols with larger credit values and larger jackpot symbols. For example, a first ante bet amount may be associated with blue configurable symbols that carry values up to 2000 credits and MINI jackpot symbols, a second ante bet amount may be associated with purple configurable symbols that carry values up to 3000 credits and MINOR jackpot symbols, a third ante amount bet may be associated with green configurable symbols that carry values up to 5000 credits and MAXI jackpot symbols, a fourth ante bet amount may be associated with red configurable symbols that carry values up to 5000 credits and MAJOR jackpot symbols, and a fifth ante bet amount may be associated with gold configurable symbols that carry values up to 7000 credits and Grand jackpot symbols. Other ranges of values may be used, as will suggest itself. Thus, the player makes an ante bet that causes the reels to carry configurable symbols in a particular range of values.

In addition, the player may select a particular denomination from a plurality of denominations. For example, the player may select a denomination of 1 cent, 2 cents, 5 cents or 10 cents. In some embodiments, the number of configurable symbols required to trigger the feature game may vary depending on the denomination selected by the player. For example, a selection of a denomination of 1 cent or 2 cents may require 6 configurable symbols to appear in the base outcome in order to trigger the feature game, while a denomination selection of 5 cents or 10 cents may cause the feature game to be triggered when 5 configurable symbols appear in the base game outcome.

Alternatively, the selection of the denomination may provide some kind of incentive with respect to some element of the game. For example, a selection of a high denomination may add a new jackpot to the game, or may add more spins to the feature game.

Alternatively, when an ante bet is made, rather than providing configurable symbols of only one color level, e.g., blue, the ante bets may provide multiple levels of configurable symbols, e.g., both blue and purple. That is, an ante bet of 1 credit may cause a selection of blue configurable symbols; while an ante bet of 2 credits will cause a selection of both blue and purple configurable symbols; while an ante bet of 3 credits will cause a selection of blue, purple, and green configurable symbols. All 5 types of configurable symbols may be provided with a particular ante bet.

FIGS. 8A and 8B illustrate the primary game display 240 during play of the base game. Briefly, the display 240 presents a game outcome using a 3×5 display matrix 830, where each column represents a different reel 832-840. The reels 832-840 are displayed as spinning and then stopping to present the matrix of display symbols representing a game outcome. FIG. 8A illustrates the reels spinning and FIG. 8B illustrates the reels in their stopped position to provide a base game outcome.

While the symbol matrix 830 is described in the context of a spinning reel game, it will be appreciated that symbol matrix 830 may be used in other types of games. For example, particularly in the context of a video display, the symbol matrix 830 may be presented and populated by symbols without providing any representation of reels spinning.

During play of the base game, the gaming device 200 may utilize one or more paylines to determine whether the display matrix 830 contains any winning symbol combinations. In particular, a gaming device 200 may provide one or more paylines and may allow the player to make a wager on each payline in a play of the primary game. For example, the gaming device 200 may include 1, 3, 5, 9, 15, 25, or some other number of paylines upon which the player may wager or otherwise activate. The gaming device 200 may allow players to make wagers of substantially different amounts on each play of the primary or base game ranging, for example, from one credit up to 125 credits (e.g., five credits on each of 25 separate paylines).

The paylines may be horizontal (see, e.g., paylines $801_1$, $801_2$, $801_3$ of FIG. 8B), vertical, circular, diagonal, angled, zigzagged, or any combination thereof. Each payline identifies a subset of symbols or display positions of the symbol matrix 830. For example, FIG. 8B depicts an embodiment having three horizontal paylines $801_1$, $801_2$, $801_3$. The top payline $800_1$ corresponds to the top row of display positions in the matrix. The center payline $800_2$ corresponds to the center row of display positions in the matrix. The bottom payline $80_3$ corresponds to the bottom row of display positions. In some embodiments, paylines $801_1$, $801_2$, $801_3$ are selectively activated based on, for example, a player's wager or gaming outcomes. In such embodiments, the gaming device 200 may only award prizes or trigger game events based on symbols aligned with activated paylines $801_1$, $801_2$, $801_3$.

The value of the mystery symbol may be determined and revealed at any time following its appearance in a game outcome. For example, in some embodiments, mystery symbols may be available during both the base game and the feature game. If a mystery symbol appears as part of a triggering game outcome in a base game, its value may be determined and revealed prior to initiation of the feature game so that the determined value of the mystery symbol may be included in the values accumulated to determine the repeater prize value. Alternatively, in some embodiments, the value of one or more of the mystery symbol(s) may not be determined and revealed until the feature game is completed.

Figure 9A:
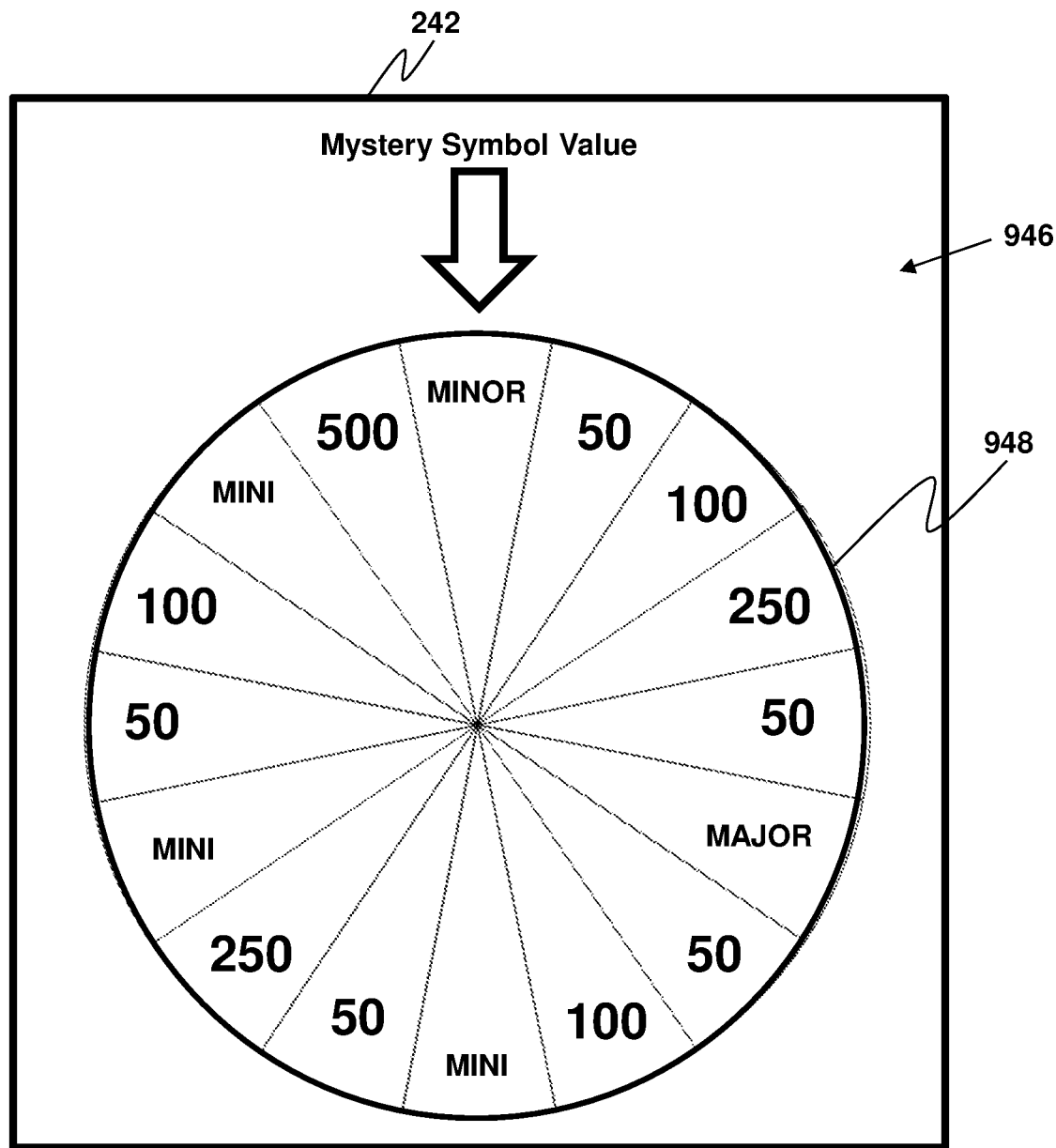
FIGS. 9A and 9B are screenshots of first and second spinning wheel games that may be employed in certain embodiments of the present disclosure.

In some embodiments, the value of the mystery symbol may be determined using a first valuation game, which may, for example, be in the form of a first spinning wheel game. The first spinning wheel game may be presented via a spinning wheel display 946 (See, e.g., FIG. 9A). The first spinning wheel display 946 includes a segmented wheel 948, where each wheel segment displays a numeric value (e.g., a number of credits or currency) or a jackpot label (e.g., MINI, MINOR, MAXI, MAJOR, and GRAND). The wheel 948 is shown as spinning and stopping (randomly) at one of the segments to indicate the value that is to be awarded for the mystery symbol. The indicated value is then used to replace the question marks on one or more of the displayed mystery symbols. The spins during the first spinning wheel game may occur automatically or the player may be prompted to spin the wheel. In some embodiments, a single random determination (e.g., wheel spin) may be used to set the value for all of the displayed mystery symbols. Alternatively, the values of each mystery symbol may be separately determined or determined in subgroups. In some embodiments, the first spinning wheel display 946 (or other valuation game) may be displayed to the player on the secondary game display 242, for example. Alternatively, the first spinning wheel display 946 (or other valuation game) may be presented on the primary display 240, for example.

In other embodiments, the value of the mystery symbols may be set in other ways. For example, there may be a player skill feature where the skill level of the player is determined or is based on particular data regarding the particular player, and the value of the mystery symbol is set accordingly. Also, a selection mechanic may be used to determine the value of the mystery symbol where a quantity of selections are displayed to the player and the player may select one or more of the displayed selections via the input device. Further, in various embodiments, the value of the mystery symbol may be randomly determined without any player input or a valuation game. Also, different levels of mystery symbols may be used, such that some levels are of higher average value than others. For example, red mystery symbols may use a red wheel with lower average values and gold mystery symbols may use a gold wheel with higher average values.

As discussed above, a Hold & Spin feature game is triggered when a determined number of configurable symbols appear in the outcome of a base game. For illustration purposes, a feature game is triggered when six (6) of the configurable symbols appear in the base game outcome. Accordingly, in addition to evaluating the base game outcomes for winning symbol combinations, the gaming device 200 also evaluates the base game outcome to determine whether the base game outcome triggers the feature game, e.g., because it includes at least six (6) configurable symbols. In this regard, the base game outcome shown in FIG. 8B triggers the feature game because it includes 6 (six) configurable symbols, in the form of a mystery symbol 806, a MINI jackpot symbol 808 and four value symbols 802 (10 credits, 10 credits, 10 credits and 20 credits).

As discussed above, the configurable symbols may also include repeater symbols whose value is not determined until a feature game is triggered. When a feature game is triggered, the gaming device 200 determines the value of repeater prize to be assigned to the repeater symbols based on the value(s) of one or more of the configurable symbols that triggered the feature game. In a preferred embodiment, the value of the repeater prize is determined by summing (accumulating) the values of the configurable symbols that triggered the feature game.

In various embodiments, the value of the repeater prize is determined by summing some of the values of the configurable symbols that triggered the feature game. In various other embodiments, the value of the repeater prize is determined by summing some or all of the values of the configurable symbols that are displayed at the conclusion of the feature game. In some of these embodiments, a multiplier may be randomly determined, predetermined, selected by a player using a selection mechanic, determined using a skill or pseudo-skill game.

In various embodiments, the feature game is triggered with configurable symbols except with the repeater symbol. During play of the feature game, one or more repeater symbols can be displayed. The value of the repeater prize can then be determined when the repeater symbol is first displayed in the feature game by summing the prize values of all of the other configurable symbols displayed in the feature game when the repeater symbol is first displayed.

When the triggering symbols include one or more mystery symbols, as in the illustrated example, the gaming device may determine the value(s) of any mystery symbols, e.g., via the first valuation game, before determining the value of the repeater prize. In this regard, the value of the mystery symbol 806 has been updated in FIG. 8C to reflect the awarding of a MINI jackpot by the mystery symbol valuation game. Accordingly, in the example, the value of the repeater prize is 3050 credits, which is the sum (1500+ 1500+10+10+10+20) of the six (6) configurable symbols that triggered the feature game. (Note, in the illustrated embodiment, the MINI jackpot has a value of $15.00 and the game is a 1 cent game where each credit has a value of 1 cent. Accordingly, the MINI jackpot symbol has a corresponding value of 1500 credits).

Figure 8C:
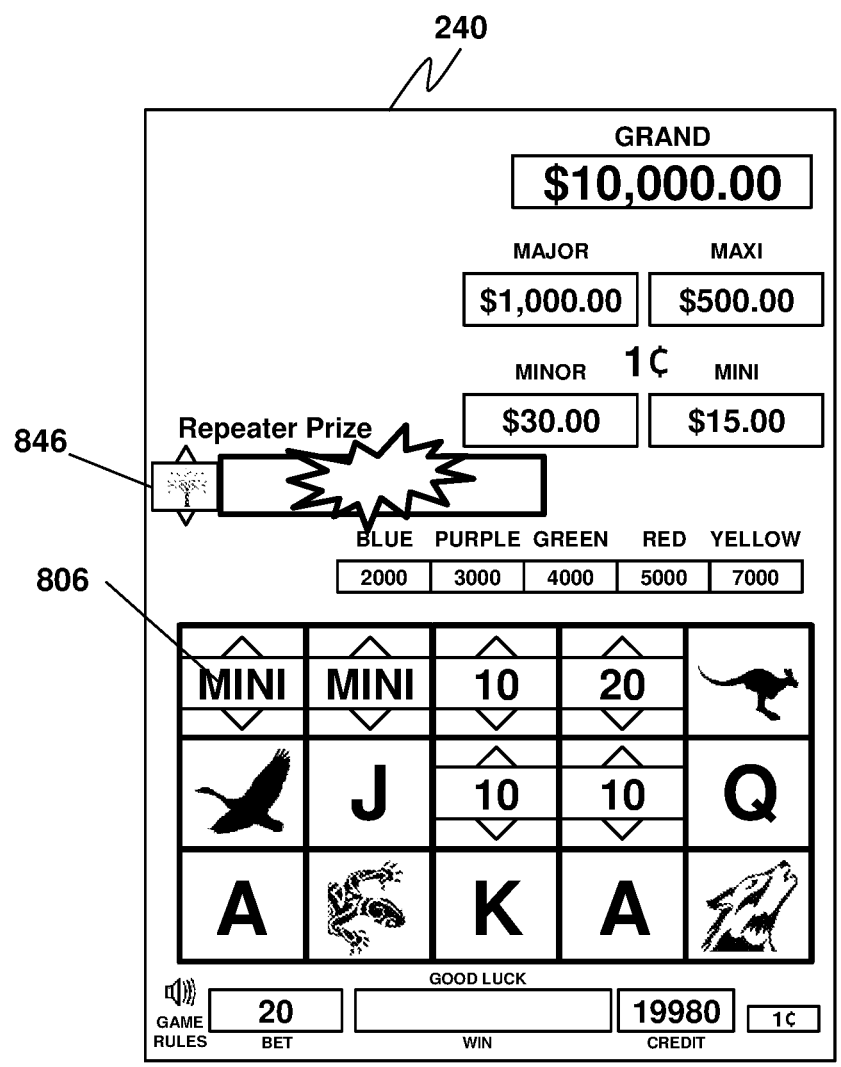
Figure 8D:
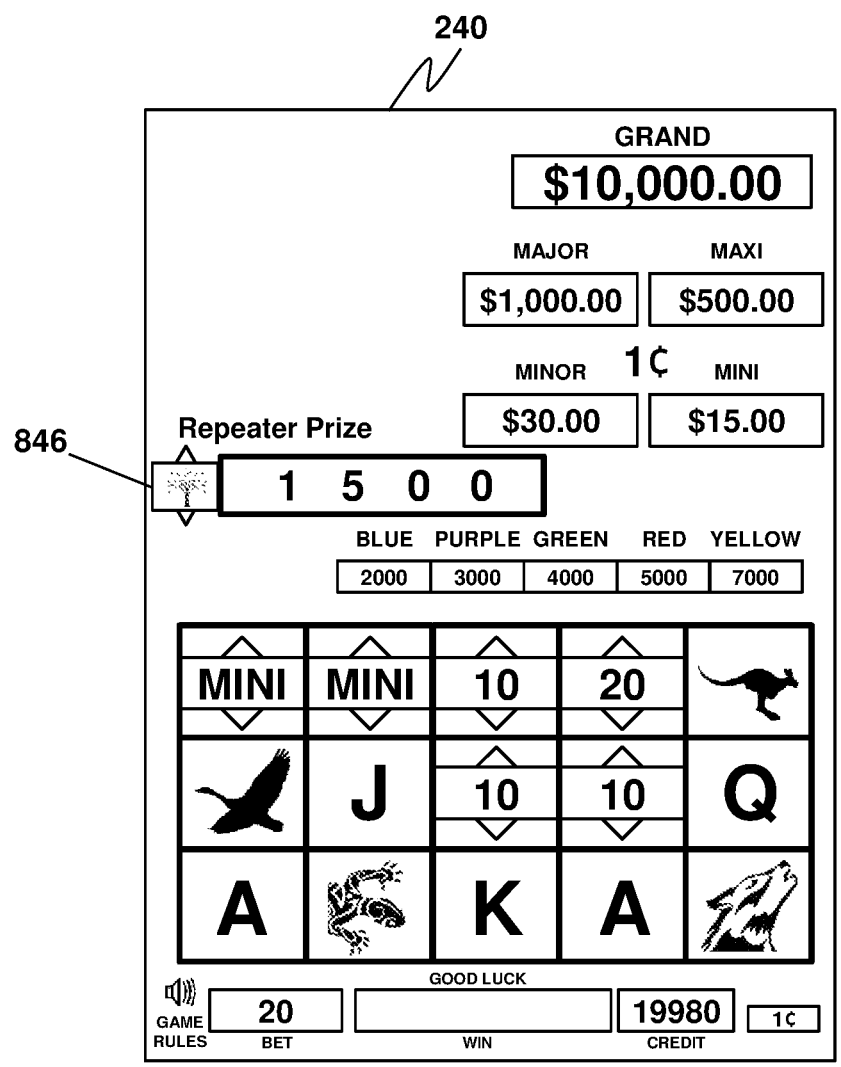
Figure 8E:
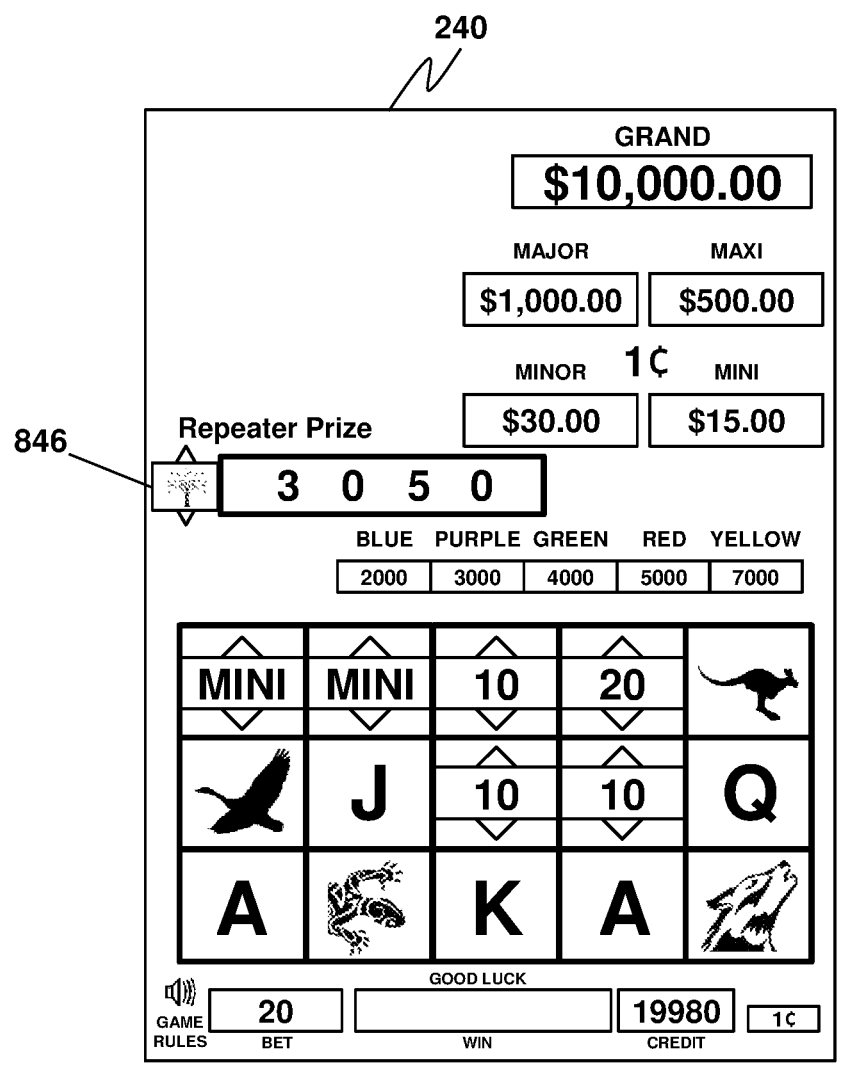

An animation may be provided to visually display the credits being accumulated (or summed) from the triggering symbols to determine the value of the repeater prize during the ensuing feature game. For example, as is shown in FIGS. 8C and 8D, the animation may display rockets (not shown) or other elements sequentially moving from each respective configurable symbol to a repeater prize meter 846. When a respective rocket reaches the meter, it may explode and the value from the originating configurable symbol may be added to the repeater prize meter. For example, in FIG. 8C, a rocket moves from a MINI jackpot prize symbol 808 to the repeater prize meter 846 where it explodes. FIG. 8D shows the repeater prize meter 846 updated to reflect that the 1500 credits (the value of the MINI jackpot) have been accumulated towards the repeater prize. The animation may continue with rockets shooting from each of the individual configurable symbols until all of the credits have been accumulated to the repeater prize meter, see e.g., FIG. 8E where the repeater prize meter 846 displays 3050 credits.

Figure 8F:
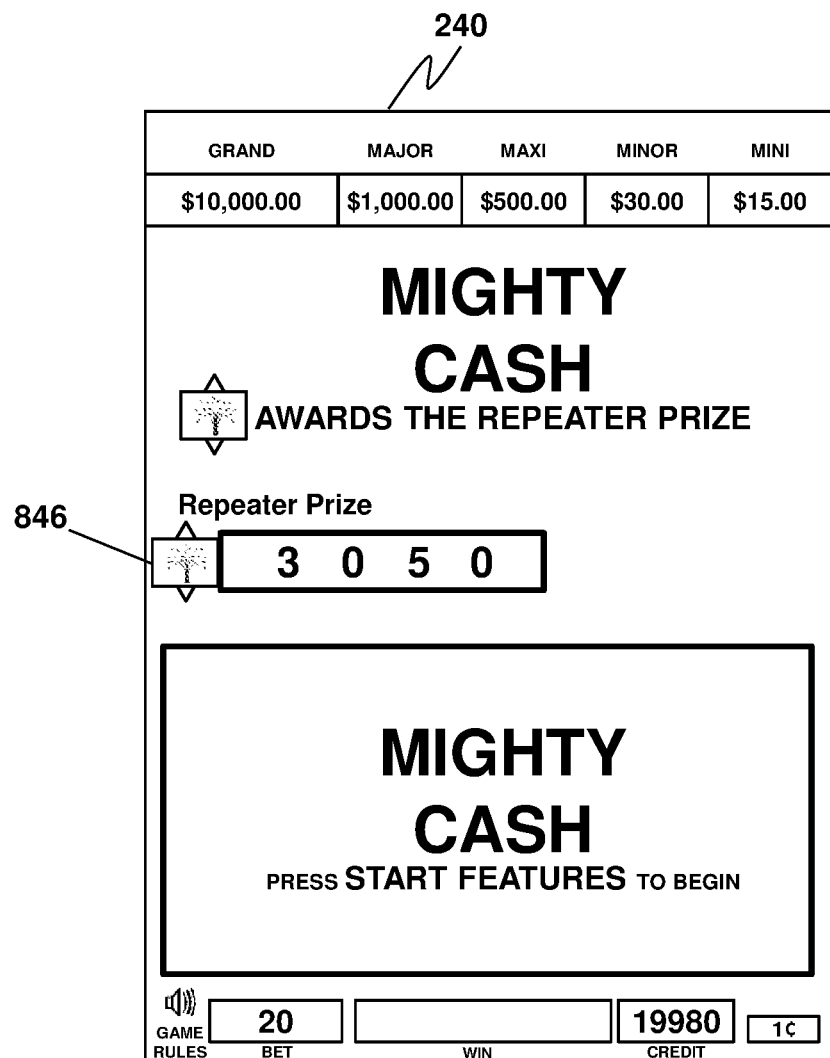

The game then transitions to the feature game. FIG. 8F is a screen shot of a transition screen that may be shown on the display 240 when transitioning from the base game to the feature game. The transition screen may prompt the player to make an input, such as to press a start button to begin the feature game.

FIGS. 8G to 8M are screen shots illustrating play of the feature game. The feature game is in the form of a Hold & Spin game in which any configurable symbols from the triggering game outcome are retained on the display and the player is awarded an additional number of spins (e.g., 6 in the illustrated example) during which the player tries to accumulate more of the configurable symbols. The display includes a spin counter 858 that displays an indication of the number of spins remaining in the feature game. The display may also include a configurable symbol counter 852 (See, e.g., FIG. 8H) that displays the number of configurable symbols that have been collected by the player. The configurable symbol counter may be initially set following the triggering game outcome and may be updated following each spin during the feature game.

Figure 8G:
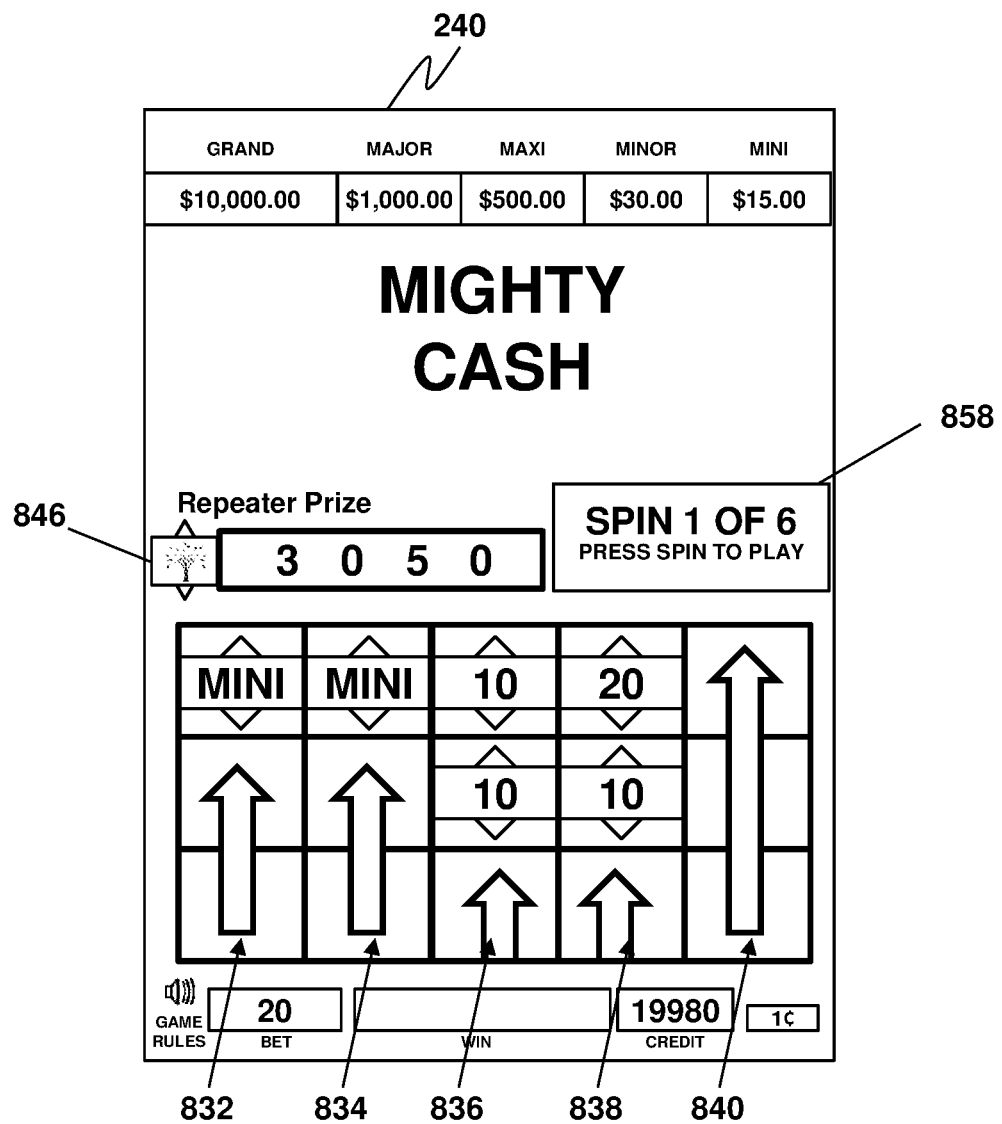
Figure 8H:
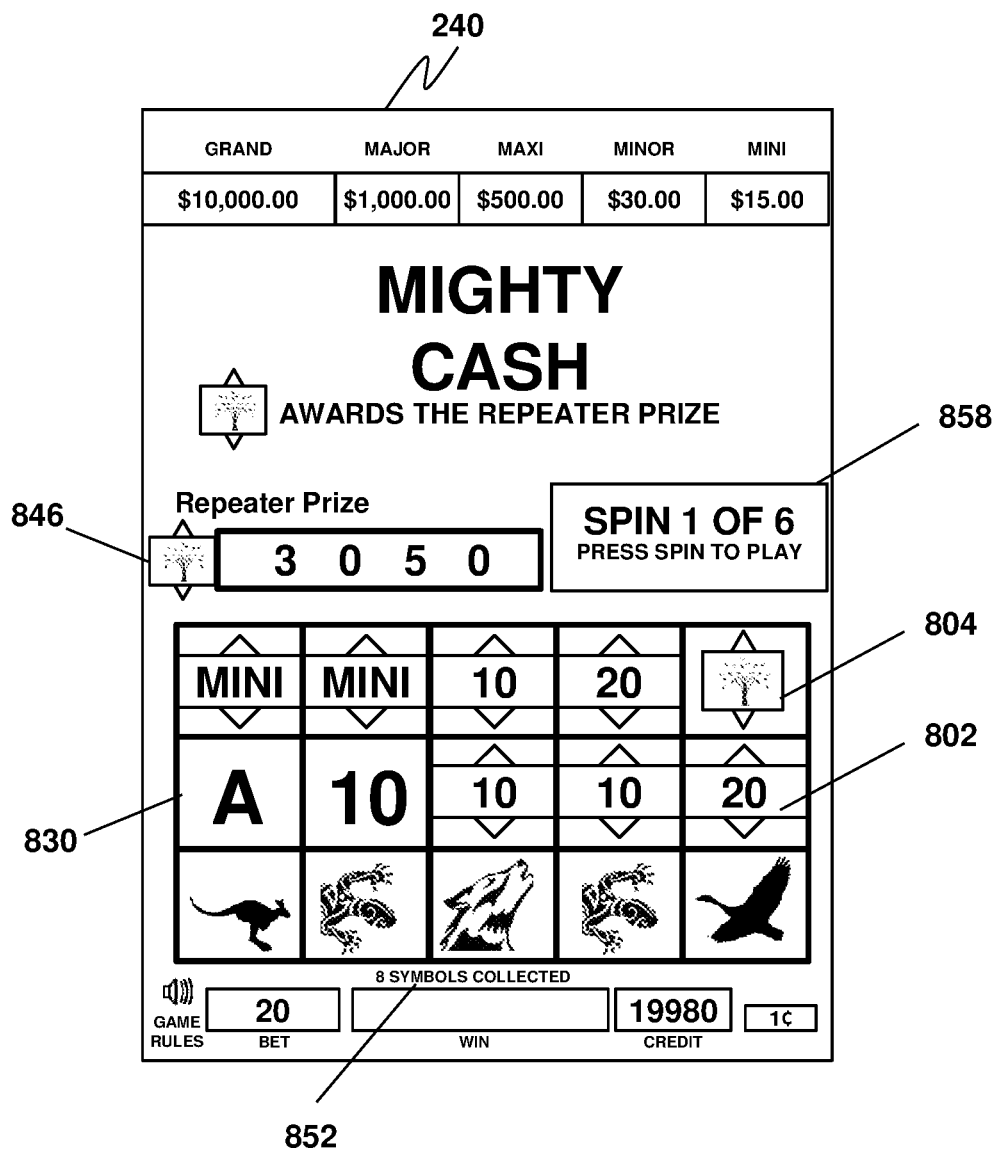
Figure 8I:
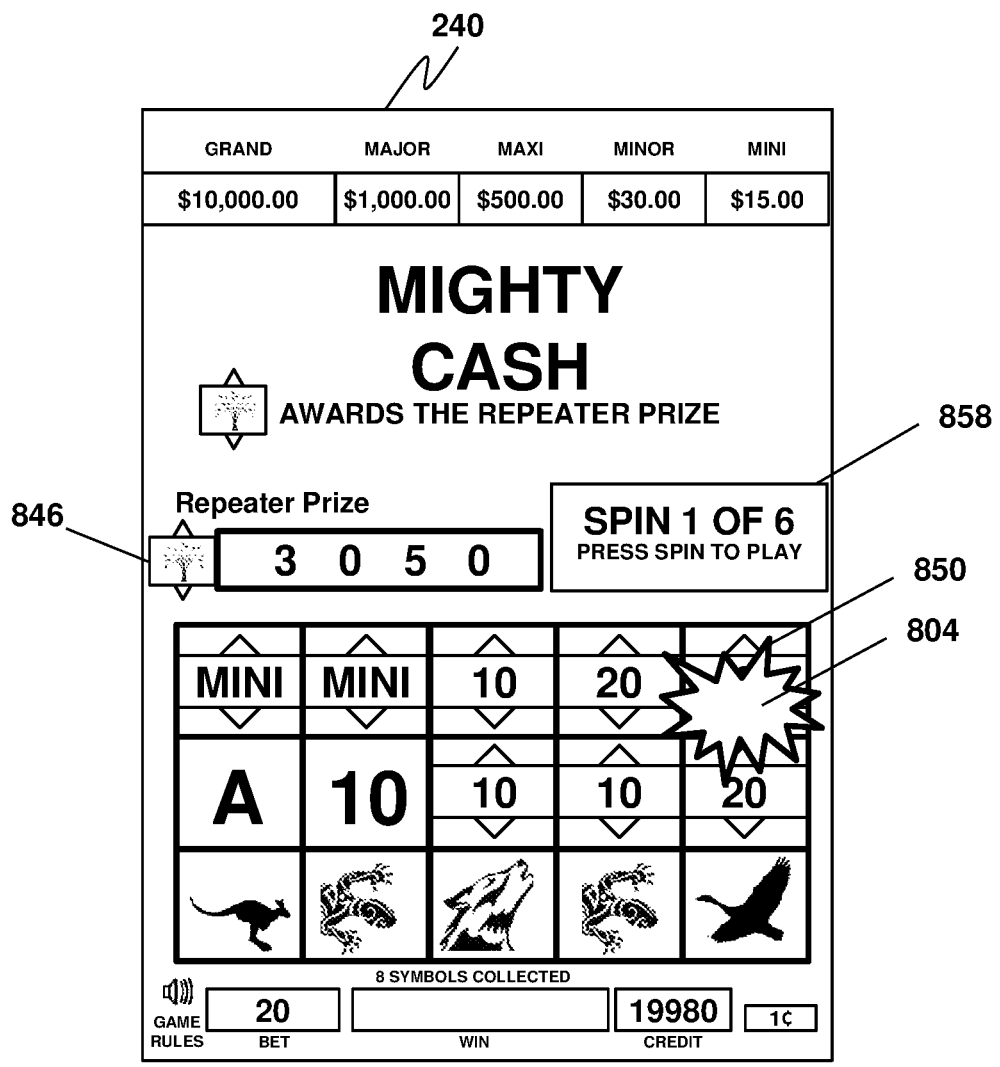
Figure 8J:
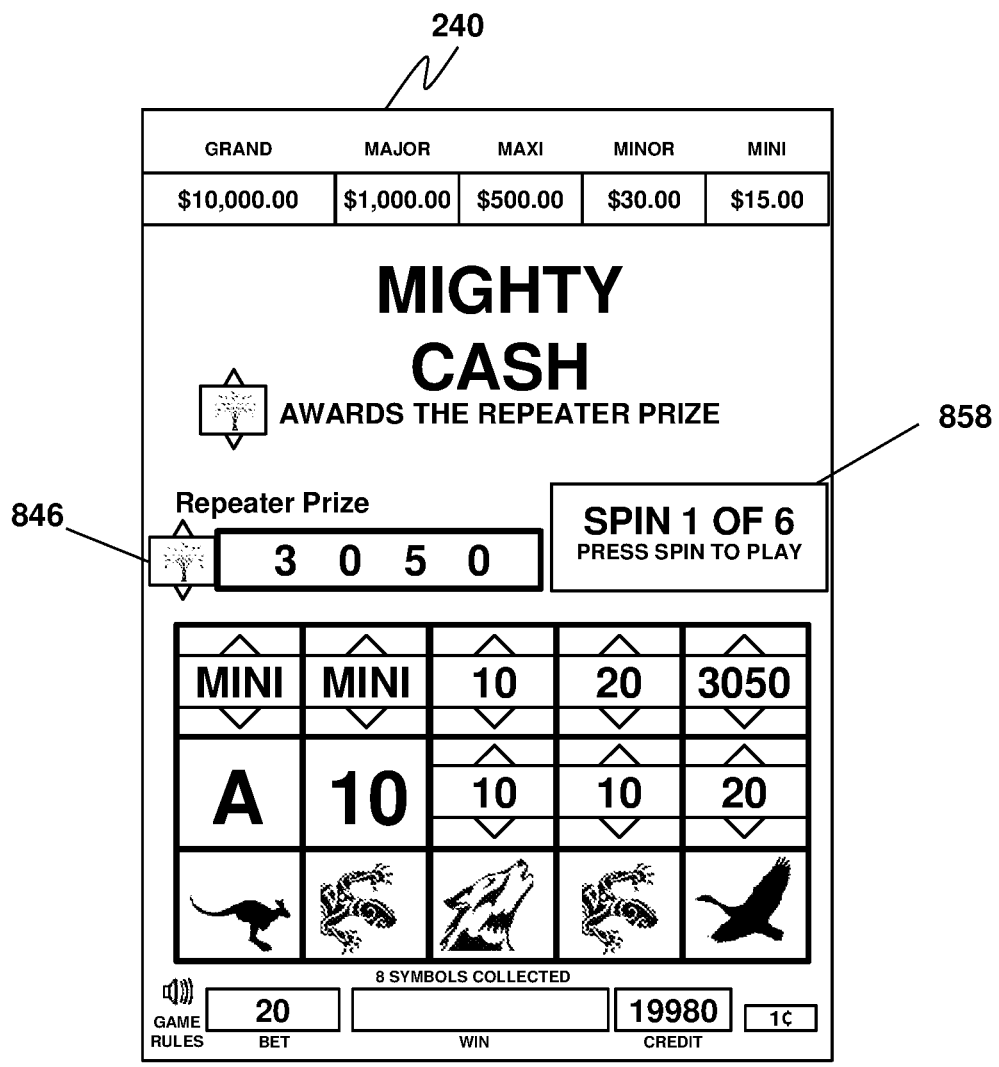

FIG. 8G shows the reels 832-840 spinning during a first spin of the feature game. As shown, the configurable symbols that appeared in the triggering game outcome are held in place on the display while the reels are shown spinning in the other symbol positions. FIG. 8H illustrates reels 832-840 in their stopped position to provide a game outcome following the first spin of the feature game. As shown in FIG. 8H, the first spin has resulted in the award of two additional configurable symbols, namely, a 20 credit value symbol 802 and a repeater symbol 804. The repeater symbol 804 may be modified to display its value (3050 credits in this example) before the next spin. For example, as is shown in FIGS. 8I and 8J, an animation 850 may display a rocket (now shown) or other element moving from the repeater prize meter 846 to the repeater symbol 804 where it explodes to reveal the repeater symbol modified to display its value. When a spin results in the award of more than one repeater symbol, the repeater symbols may be modified simultaneously or sequentially to display their values.

Figure 8K:
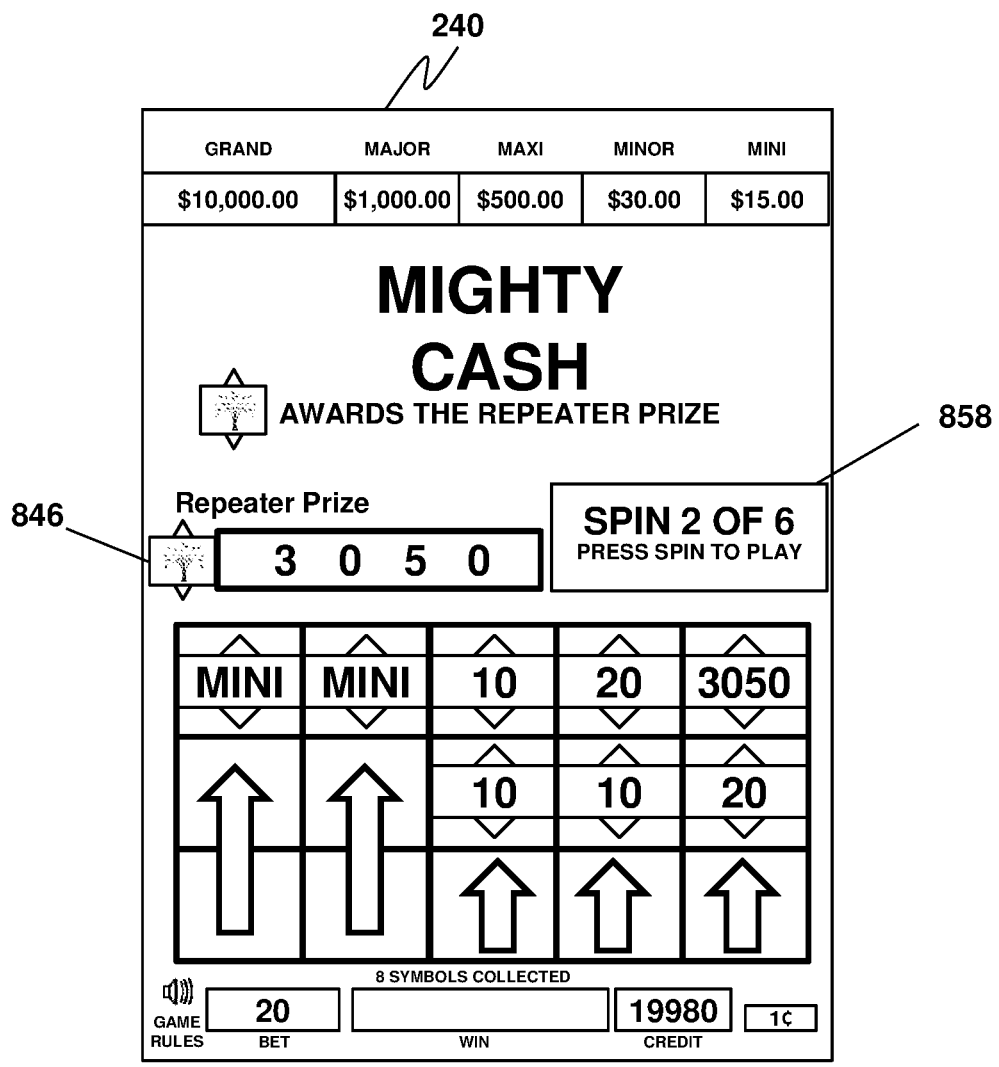
Figure 8L:
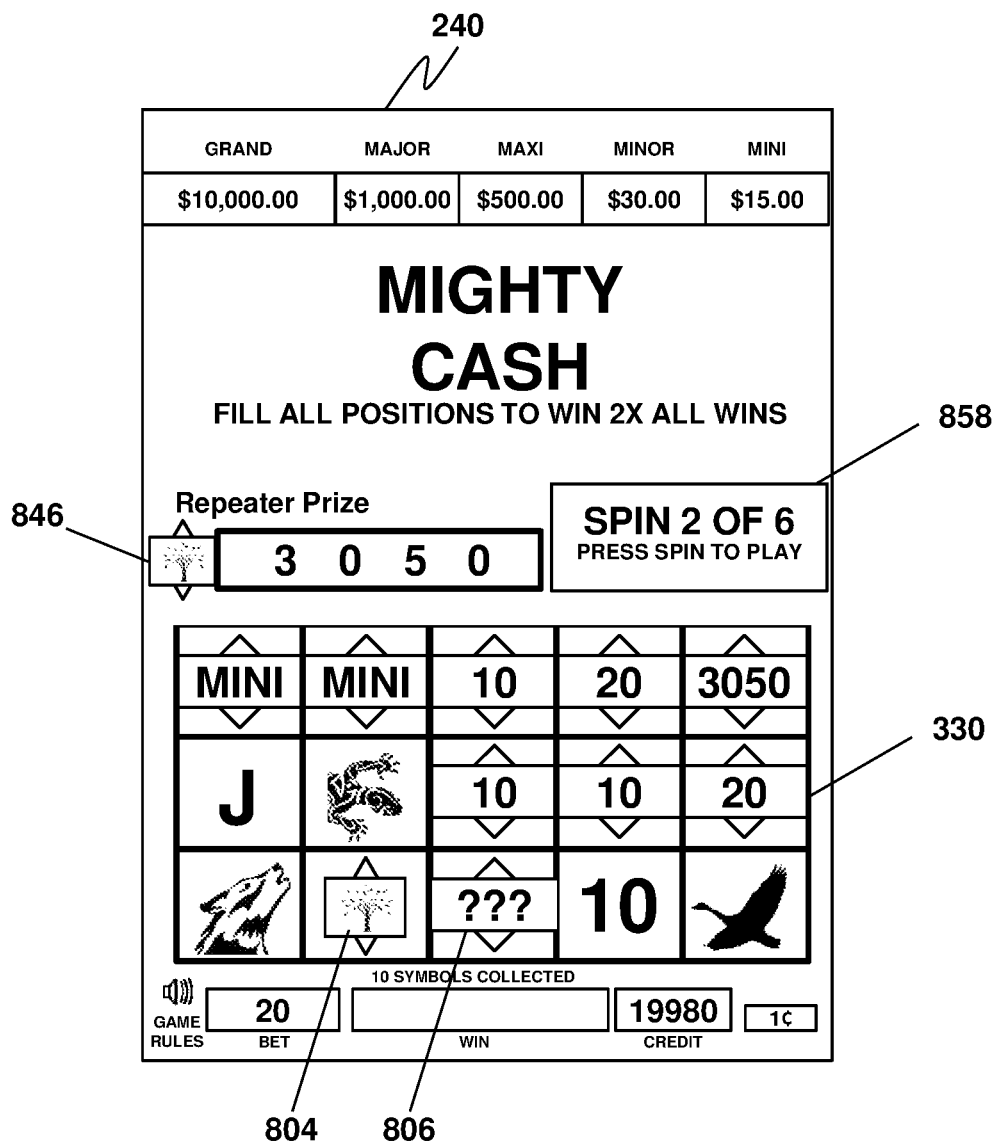

The player is then prompted to initiate a second spin of the feature game. During the second spin, the configurable symbols that were previously awarded (collected) are held in place on the display matrix and the reels are shown spinning in the other symbol positions of the display matrix. FIG. 8K shows the display during the second spin of the feature game, and FIG. 8L shows the reels in their stopped position to provide a game outcome following the second spin of the feature game. As shown in FIG. 8L, the second spin has resulted in the award of two additional configurable symbols, namely, another repeater symbol 804 and a mystery symbol 806. As discussed above, the value of the mystery symbol may be determined using a valuation game, such as a spinning wheel game. (See, e.g., FIG. 9).

Figure 8M:
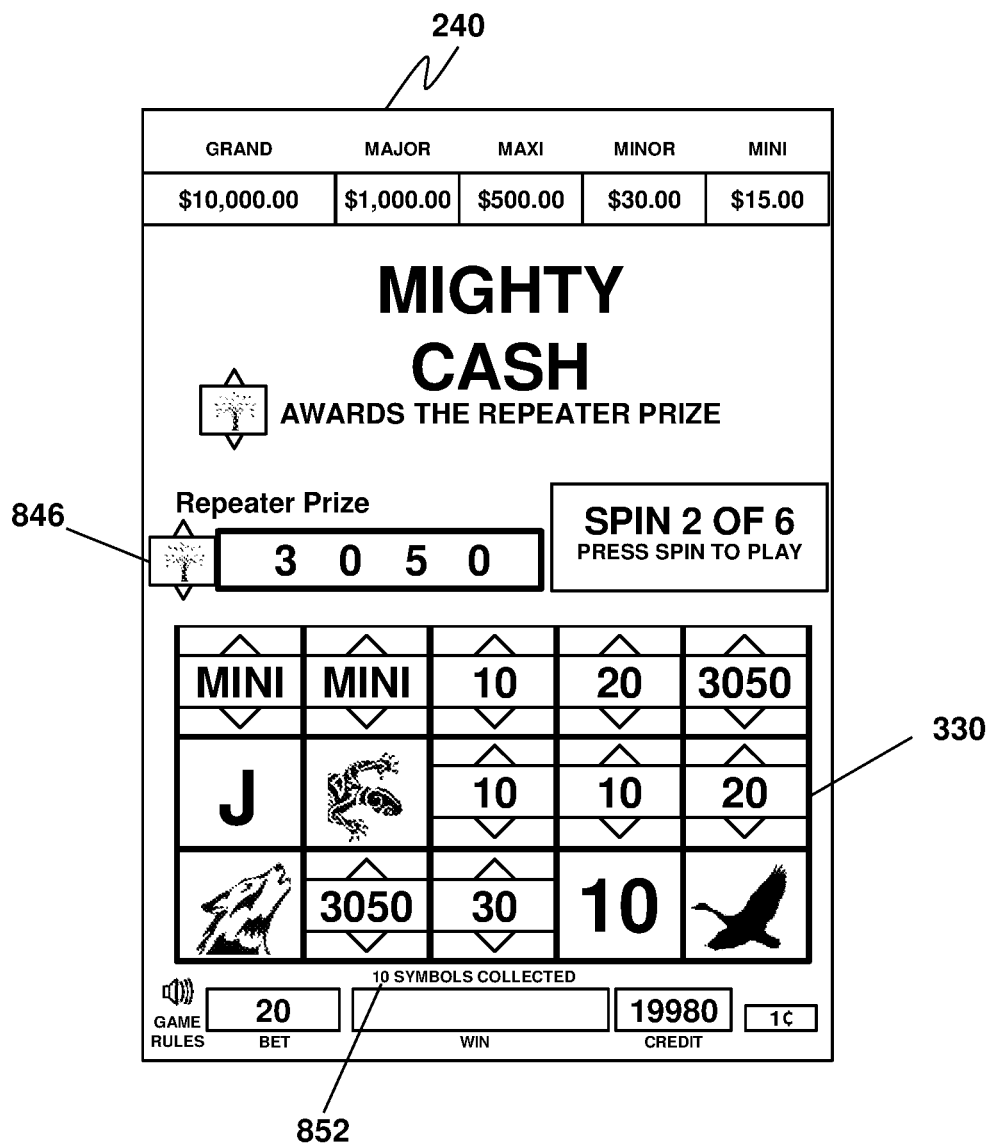

FIG. 8M shows the display after the repeater and mystery symbols that were awarded during the second spin have been modified to show their determined values, e.g., 3050 credits for the repeater symbol and 30 credits for the mystery symbol.

The feature game continues in the manner described until all of the spins have been completed. Once the feature game is completed, the controller determines and pays out a feature game award. For example, if the matrix 830 is not fully populated with configurable symbols, the player may be awarded a prize amount corresponding to the accumulated value of the displayed configurable symbols.

Figure 9B:
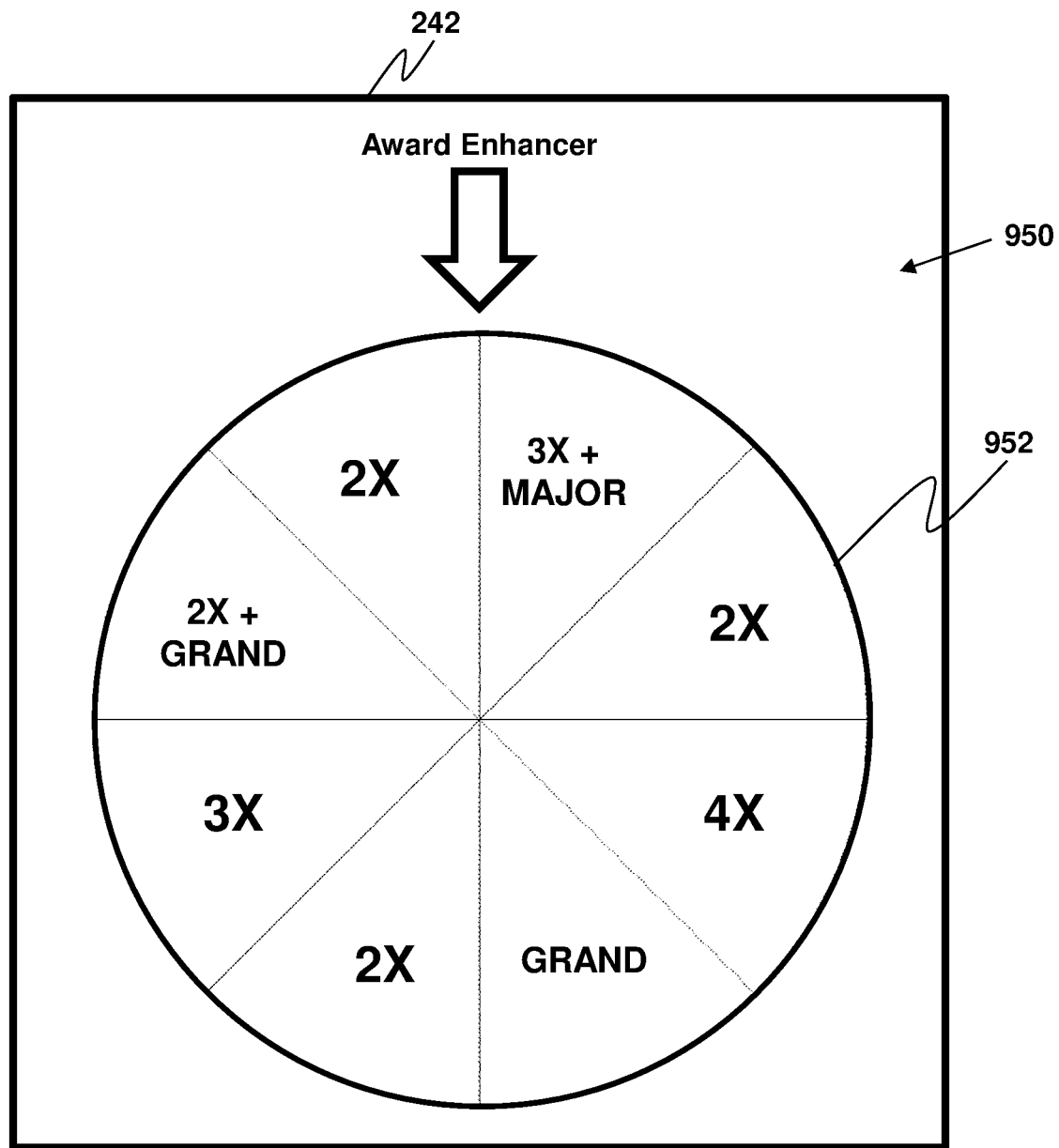

In various embodiments, if the display matrix 330 is completely filled with configurable symbols, the player may be awarded an enhanced award. In some embodiments, the enhanced award may be a fixed prize such as a 2× multiplier of the accumulated value or the award of a jackpot, such as the Grand jackpot. In some embodiments, the enhanced award may be determined via a second valuation game. The second valuation game may be similar to the first valuation game, but may provide different and/or enhanced values from those used in the first valuation game. For example, as shown in FIG. 9B, the second valuation game may be conducted using a second spinning wheel display 950 with a segmented wheel 952 that may include multipliers (i.e. 2× or 3×) or multipliers with jackpots (i.e. 2×+Grand or 3×+Major). The multiplier value indicated by the spin of the second spinning wheel display affects the sum total value of all "hold" value symbols collected in the Hold & Spin game (i.e. "2×" will double the sum total value); the jackpot enhances the Hold & Spin award by the amount of the jackpot (i.e. $50, $500 or $5000 will be added to the sum total value).

In certain embodiments, once the play of all the spins of the feature game is completed, the gaming device 200 may determine whether to provide an additional quantity of spins of the feature game. In one or more embodiments, the gaming device 200 can randomly select the additional quantity of spins to be provided. In certain other embodiments, the gaming device 200 can present a quantity of picks and receive player input. The selected pick is then revealed by the gaming device 200 and the additional quantity of spins corresponding to the player pick is provided. In certain embodiments, the gaming device 200 can first determine whether to provide the additional quantity of spins and then do a second determination to determine the quantity to be provided. It will be apparent to those skilled in the art that there are various ways, such as a wheel game, etc., that may be used to determine and present the additional quantity of plays.

Figure 10A:
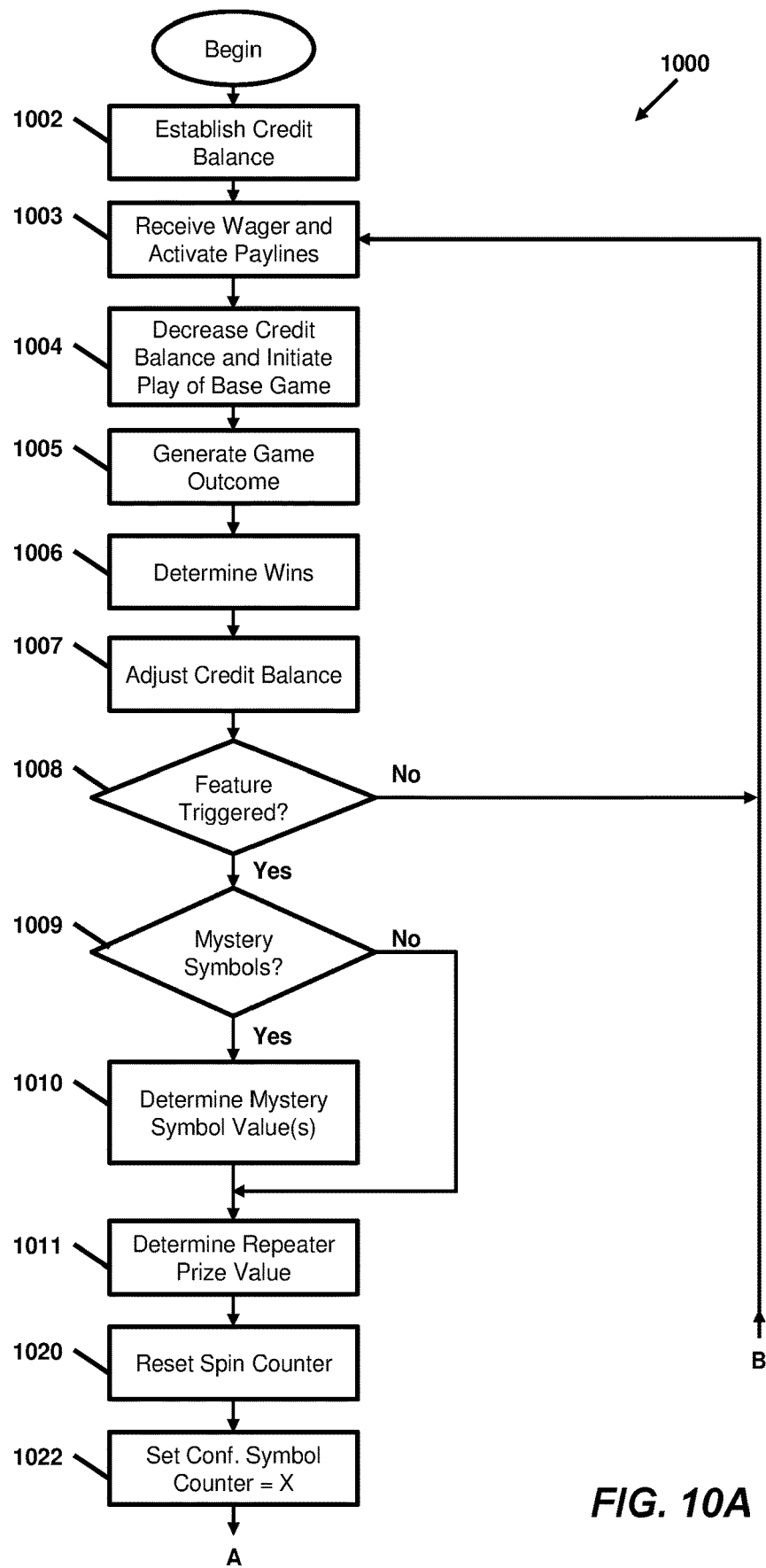
FIGS. 10A and 10B are a flow diagram for an example embodiment of a process for operating the EGM of FIG. 2 in accordance with various aspects of the present disclosure.
Figure 10B:
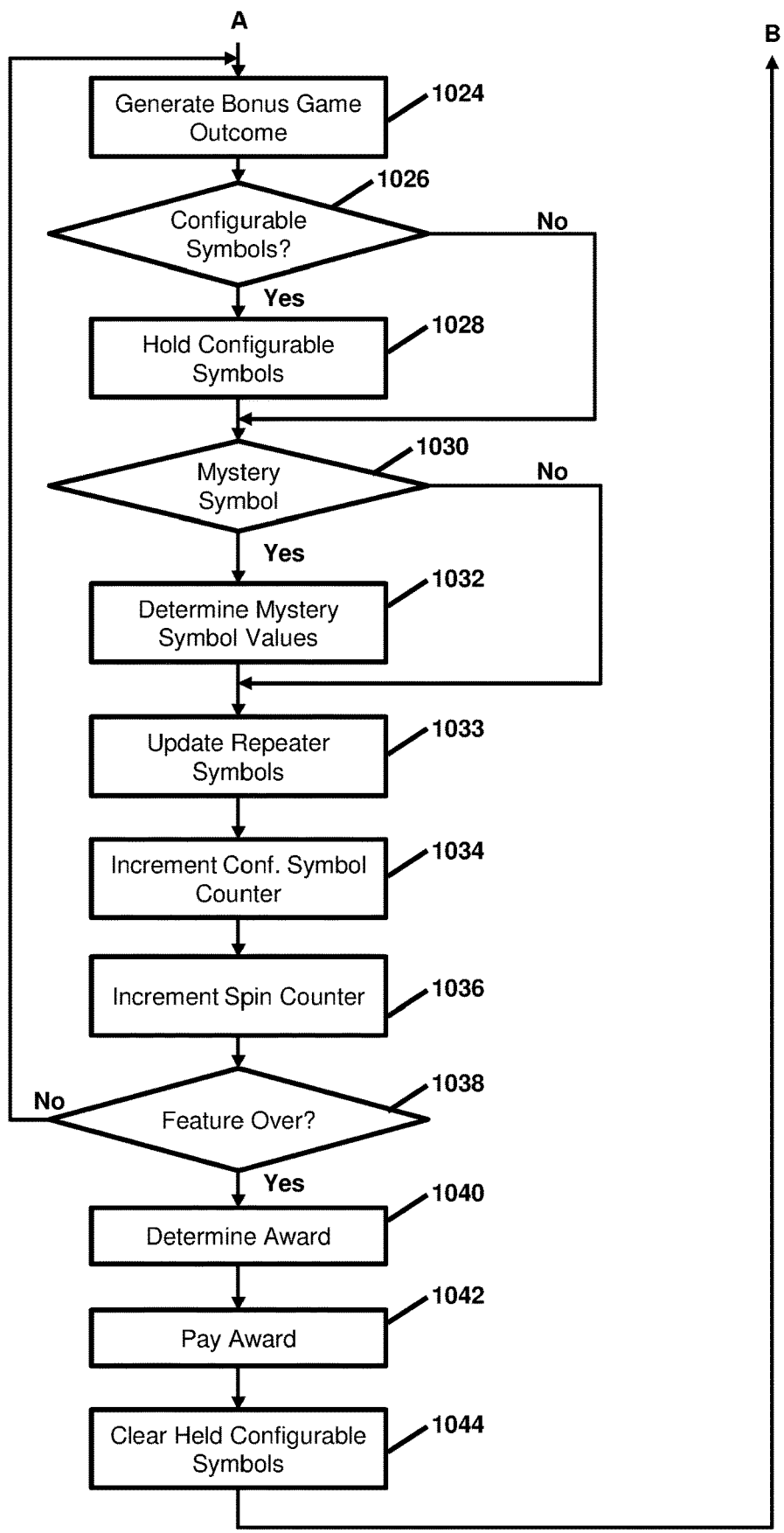

Exemplary play of the base and feature game with repeater and mystery symbols will now be described with additional reference to the flowchart shown in FIGS. 10A and 10B. At 1002, the gaming device 200 may establish an associated credit value on a credit meter. To this end, a player may insert a physical item having monetary value into a credit input mechanism, such as the ticket reader 224 or bill validator 234, of the gaming device 200. In response to the received physical item, the gaming device 200 may increase a credit value of the credit meter 815 (see FIG. 8A) based on the monetary value of the physical item.

At 1003, the gaming device 200 may receive a wager and may activate one or more paylines, such as paylines 801$_1$, 801$_2$, 801$_3$. For example, in some embodiments, the gaming device 200 allows the player to selectively activate a number of paylines via the player input buttons 236. In other embodiments, the paylines may be automatically activated by the gaming device 200 without player input. A player may also use the player input buttons 236 to specify a value of an amount to be wagered on each active payline with the wager being funded by the credit value of the credit meter.

The gaming device 200 may display a message such as "Press SPIN to play" in a message box, e.g., on the primary game display 240. When the player presses a SPIN button, e.g., in the player input buttons 236, the gaming device 200, at 1004, may decrease the player's credit balance by the specified wager and initiate play of a spinning reel game by spinning reels 832-840. (See, e.g. FIG. 8A).

Next, at 1005, the gaming device 200 may stop the reels 832-840 based on one or more random values generated by RNG 212 to obtain a base game outcome comprising a matrix 830 of symbols. (See, e.g., FIG. 8B). In other embodiments, the gaming device 200 may stop the reels 832-840 based on information received from central determination gaming system server 106.

The gaming device 200, at 1006, may then determine whether the symbols displayed in the symbol matrix 830 include one or more winning symbol combination. For example, at 1010, the gaming device 200 may determine if there are any winning combinations of symbols along one of the activated paylines. Winning symbol combinations along the activated paylines may result in the award of prize(s) by increasing the credit value of the credit meter based on the prize(s) for such winning combination(s).

At 1007, the gaming device 200 may adjust the credit balance on the credit meter 535 in accordance with any winning symbol combinations that were identified in 1006. The gaming device 200 may also control the display 240 to provide a message reflective of the game outcome. For example, when the game outcome includes one or more winning symbol combinations, the display 240 may display a message such as "Congratulations—You Won X Credits!" (where X is the number of credits won by the player). Conversely, when the game outcome does not include any winning symbol combinations, a message such as "Sorry—You Didn't Win—Spin Again" may be displayed to the player.

At 1008, the gaming device 200 determines whether a feature triggering event occurred. The game triggering event may occur, for example, on the occurrence of a predetermined combination of symbols, or at random, or by some other process. As discussed above, in the embodiment of FIGS. 8A-8I, a feature game is triggered by the appearance of 6 or more configurable symbols in a base game outcome. For example, the base game outcome shown in FIG. 8B triggers the feature game because it includes at least six (6) configurable, i.e., symbols, in the form of a mystery symbol, a MINI jackpot symbol, and four value symbols (10 credits, 10 credits, 10 credits, and 20 credits). When a trigger event occurs, the gaming device 200 displays a message such as "Congratulations, You Triggered The HOLD & SPIN FEATURE Game" on the primary game display 240. In various embodiments, the minimum number of configurable symbols needed to trigger the feature game may be predetermined, randomly determined, based on a wager amount, or based on a denomination, etc.

If the feature game is not triggered, the process returns to 1003 to allow the player to continue playing the base game. Alternatively, when a feature trigger occurs, the gaming device 200 may transition to a feature game as described below.

Prior to transitioning to the feature game, the gaming device 200 may, at 1009 and 1010, determine the value(s) of any mystery symbols that were displayed in the base game outcome that triggered the feature game. As discussed above, the gaming device 200 may determine the values to be assigned to the mystery symbols using a valuation game that may be displayed, for example, on the spinning wheel display 946 (see, e.g., FIG. 9A). Upon determining values for any displayed mystery symbols, the gaming device 200 may cause the display 240 to replace the mystery symbols with their respective determined values. (See, e.g., FIGS. 8B and 8C, which illustrate the mystery symbol 806 being updated to MINI jackpot symbol). Although not illustrated, an animation may be shown when updating the display matrix 830 to show values assigned to mystery symbols.

At 1011, the gaming device 200 determines the repeater prize value and sets the repeater prize meter 846 in accordance with the determined value. In the illustrated embodiment, the repeater prize value is determined as the sum of the configurable symbols (including the determined value of any mystery symbols) that triggered the feature game. Accordingly, in the above example, the repeater prize meter 846 is set to 3050 credits, which is the sum (1500+1500+10+10+10+20) of the six (6) configurable symbols that triggered the feature game. (See, e.g., FIG. 8E).

Before beginning the Hold & Spin feature game, the gaming device 200 also resets the spin counter 858 to its starting value at 1020. In the illustrated embodiment, the feature game provides 6 rounds/spins, so the spin counter 858 is reset to indicate that this is spin 1 of 6.

In transitioning from the base game to the feature game, the gaming device 200 may cause the display 240 to provide a transition screen. (See, e.g., FIG. 8F). When the player presses a Start Feature button, e.g., on the player input buttons 236, the game transitions the display 240 to present the Hold & Spin feature game. (See, e.g., FIG. 8G).

The gaming device 200 may display a message such as "Press SPIN to Play" on the display 240. When the player presses the SPIN button, the gaming device 200, at 1024, controls the symbol matrix 830 to show reels 310A-310E as spinning (see, e.g., FIG. 8G) and stopping (based on one or more random values generated by RNG 212) to obtain a game outcome. (See, e.g., FIG. 8H). As noted above, the symbol set in the feature game utilizes configurable and non-configurable symbols.

The gaming device 200, at 1026, may then determine whether the feature game outcome from the first spin includes any new configurable symbols. In the illustrated example, the first spin has resulted in the award of two additional configurable symbols, namely, a 20 credit value symbol 802 and a mystery symbol 806. (See FIG. 8H).

Next, at 1028, any configurable symbols shown in the game outcome are held on the symbol matrix 830.

At 1030, the gaming device 200 determines if the game outcome includes any mystery symbols. If no mystery symbols are present, control moves to 1034. Conversely, if the displayed game outcome incudes one or more mystery symbols, control moves to 1032 where the gaming device 200 determines the value(s) to be assigned to the mystery symbols. The value of the mystery symbol may, for example, be determined using a valuation game, such as the first spinning wheel game. (See, e.g., FIG. 9A).

At 1033, the gaming device 200 determines if the spin resulted in the award of any new repeater symbols. Any new repeater symbols 804 may be modified to display its value (3050 credits in this example) before the next spin. (See, e.g., FIGS. 8I and 8J). As noted above, when a spin results in the award of more than one repeater symbol, the repeater symbols may be modified simultaneously or sequentially to display their values At 1034, the gaming device increments the configurable symbol counter 852 to reflect the number of configurable symbols that have been collected thus far by the player. Next, at 1036, the gaming device 200 optionally increments the feature game spin counter 858.

Next, at 1036, the gaming device 200 optionally increments the feature game spin counter 858. At 1038, the gaming device 200 determines if the feature game is over. Specifically, the feature game ends in this example if no spins remain or if the matrix 330 has been filed with configurable symbols.

If the feature game is not over, control returns to 1024 where the gaming device 200 waits for the player to press the spin button to generate another feature game outcome. The feature game continues in the manner described until all of the spins have been completed or the display matrix is filled with configurable symbols.

Once the feature game is completed, control moves to 1040 where the gaming device 200 determines the award to be paid to the player in connection with the feature game. If the matrix is not completely filled with configurable symbols, the award may be determined by summing the credits of the configurable symbols that were awarded and held during the feature game. An enhanced award may be provided for completely filling the matrix 830 with configurable symbols. In some embodiments, the enhanced award may be a fixed prize such as a 2× multiplier of the accumulated value. In some embodiments, the enhanced award may be determined via a second valuation game, such as the second spinning wheel game. (See, e.g., FIG. 9B).

Upon determining the award, control moves to 1042 where the gaming device 200 pays out any awards to the player, e.g., by adding the awarded credits to the credit balance on the credit meter 535. Next, at 1044, the gaming device 200 clears the held configurable symbols and control returns to 1002 where the player may continue to play the base game.

Those of ordinary skill will appreciate that (1) the number of configurable symbols required to trigger the feature game; (2) the number of free games awarded; (3) number of decrements of free game counter; (4) the number of configurable symbols that have to be displayed to win a prize or jackpot in the feature game; (5) the multiplier to apply; and (6) the value of the mystery symbol; (7) the additional quantity of spins; (8) the prize value of the configurable symbols; or (9) any other determination or variable described or contemplated in the present disclosure may at least in part be (a) randomly determined; (b) predetermined; (c) determined based on a wager amount and/or level; (d) centrally determined; (e) determined based on a generated symbol or symbol combinations; (f) determined based on player selection; (g) determined based on player skill; (h) determined based on a side wager or ante bet; (i) determined based on a status of the player; (j) determined as a combination of two or more determinations disclosed herein; etc.

Multiple Game Instances

FIGS. 11A to 11G are screen shots of a display, such as the primary game display 240, at different phases during play of a base game and an ensuing feature game according to another embodiment of the present disclosure. This embodiment is similar to the embodiment of FIGS. 8A to 8M, except that this embodiment provides multiple game instances that are played independently during the hold and spin feature game. In the illustrated example, an ante bet results in the occurrence of two game instances when the feature game is triggered. In other embodiments, a greater number of game instances may be provided. For example, in some embodiments, the number of game instances provided may depend on the size of the ante bet.

In some embodiments, the game may replicate and re-replicate any number of times (i.e. 1 game replicates 2 times and then another 3 times) according to the same or varied triggering conditions. For example, a base game replicates one time upon the appearance of any six or more scatter symbols and, as a result, provide two independent games. Each of these two games may then replicate again upon the appearance of any one or more special scatter symbols. This re-replication process may occur indefinitely or cease upon reaching a predetermined number of games.

In some embodiments, the game may include any number or type of symbol from the original game in the replicated game(s) (e.g., only replicates the highest value symbols).

In some embodiments, the base and replicated games may play independently (as illustrated in prior embodiments) or dependently (i.e. only plays the first replicated game if the base game collects 12 or more held symbols).

In some embodiments, the game may include award enhancements for any or all of the games played (i.e. the original game pays 2×, the first replicated game pays 3×, the second replicated games pays 4×).

In various embodiments, a first trigger may result in the occurrence of two game instances, and subsequent to the first trigger, a second trigger may result in the occurrence of a third game instance.

Figure 11A:
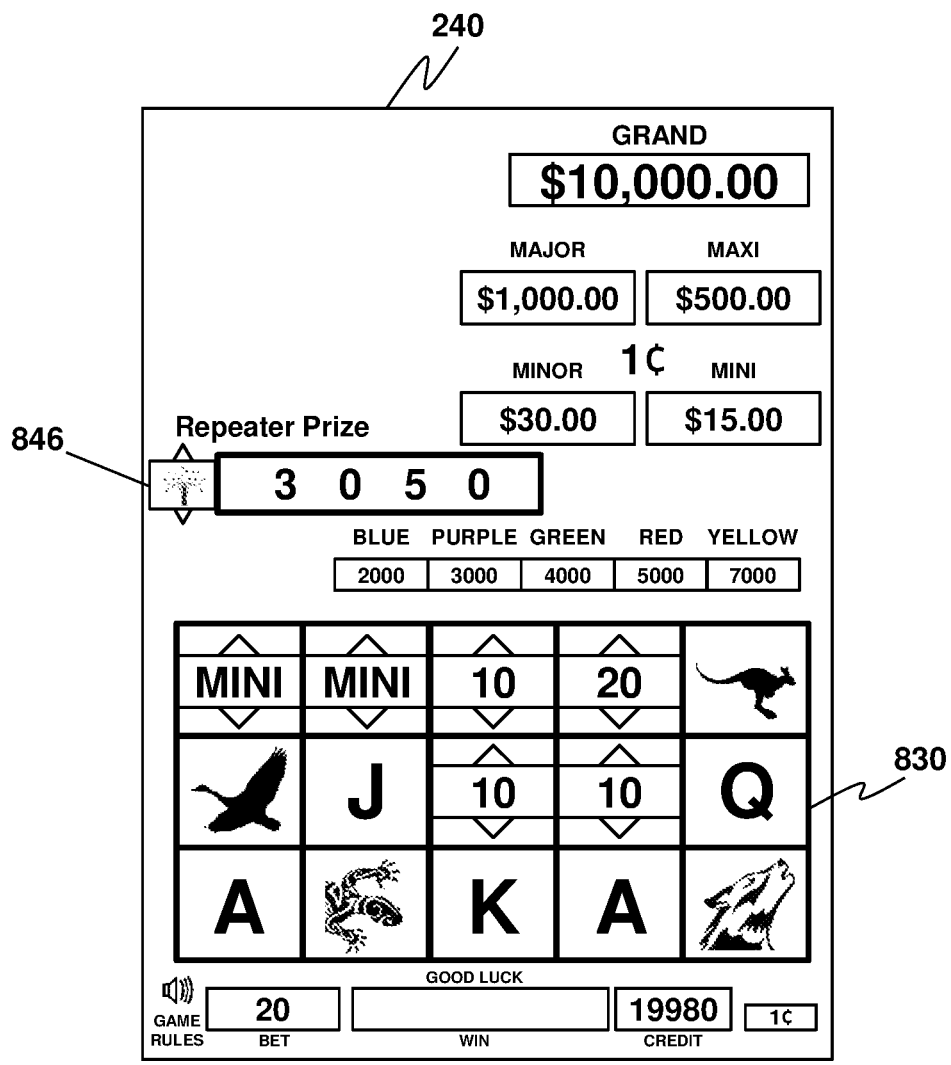
FIGS. 11A to 11G are screen shots of another embodiment of a feature game.

FIG. 11A illustrates the primary game display 240 during play of the base game. In particular, FIG. 11A illustrates a base game outcome, which triggers the feature game because it includes 6 (six) configurable symbols, in the form of two MINI jackpot symbols and four value symbols (10 credits, 10 credits, 10 credits and 20 credits). In this embodiment, an ante bet results in the feature game triggering outcome being replicated to initially provide a plurality of game instances (two in the illustrated embodiment) that are played independently during the feature game. If the feature game is triggered but the ante bet is not placed, the feature game proceeds as described above in connection with of FIGS. 8A to 8M.

Figure 11B:
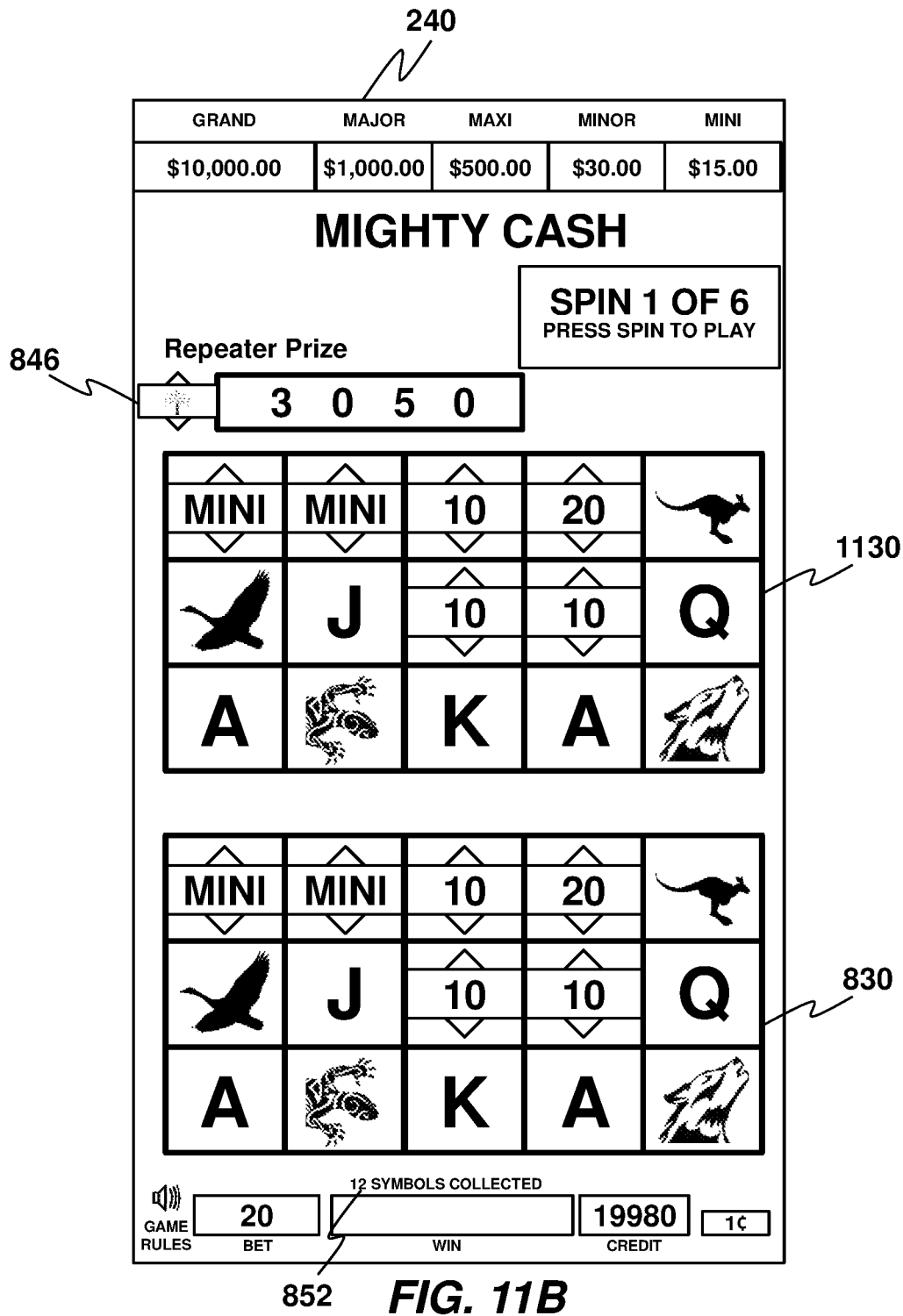

FIG. 11B illustrates the display 240 at the start of the hold and spin feature in an instance where the ante bet has been placed. In the illustrated embodiment, the ante bet causes the triggering base game outcome (of matrix 830) to be fully replicated in second matrix 1130 so that the feature game initially begins with two identical matrices 830 and 1130. In other embodiments, the additional display matrix (or matrices) may include any number or type of symbols from the triggering base game outcome. For example, in some embodiments, each additional display matrix only replicates the configurable symbols from the feature game triggering outcome. In some other embodiments, each additional display matrix only replicates the highest value symbols from the feature game triggering game outcome.

Figure 11C:
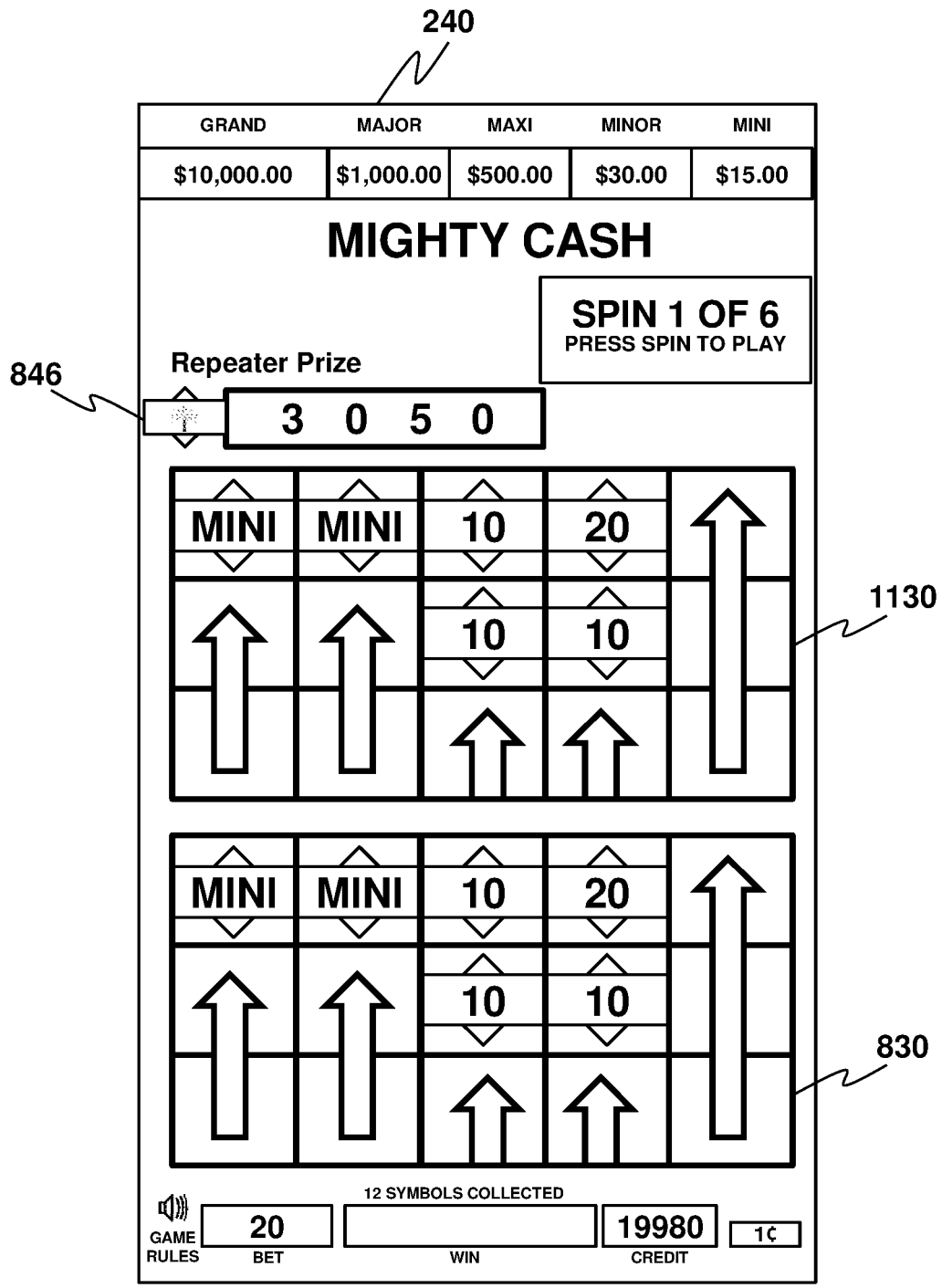

During each round of the feature, the matrices are played independently from one another. In this regard, FIG. 11C shows the reels of the matrices 830, 1130 spinning during a first spin of the feature game. As shown, the configurable symbols that appeared in the triggering game outcome are held in place in the matrices 830, 1130 while the reels are shown spinning in the other symbol positions.

Figure 11D:
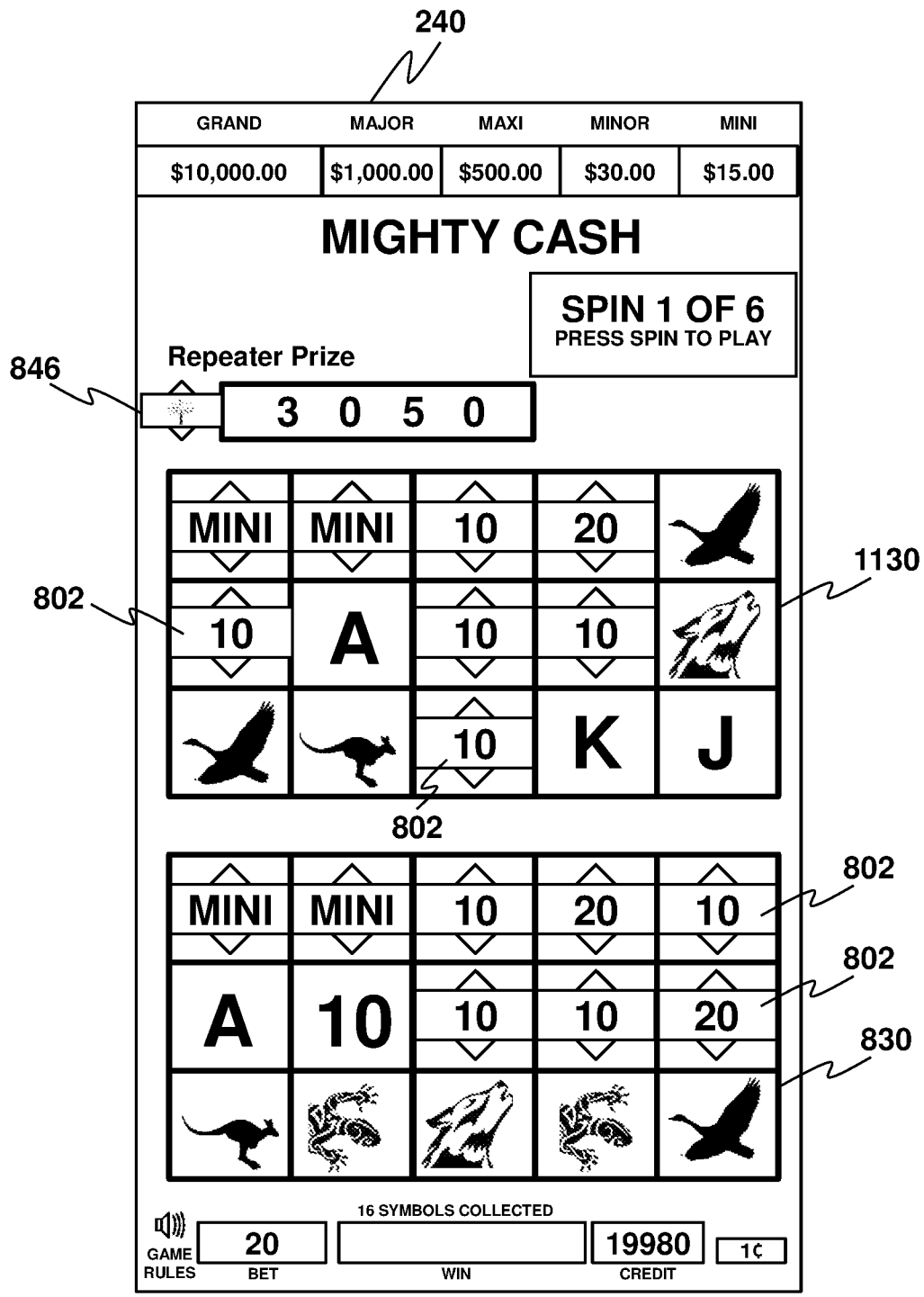

FIG. 11D illustrates the matrices 830, 1130 after the reels have stopped following the first spin of the feature game. In the example, the first spin has resulted in the award of two additional configurable symbols in the first matrix 830, namely a 20 credit value symbol and a 10 credit value symbol. The first spin also resulted in the award of two 10 credit value symbols in the second matrix 1130.

Figure 11E:
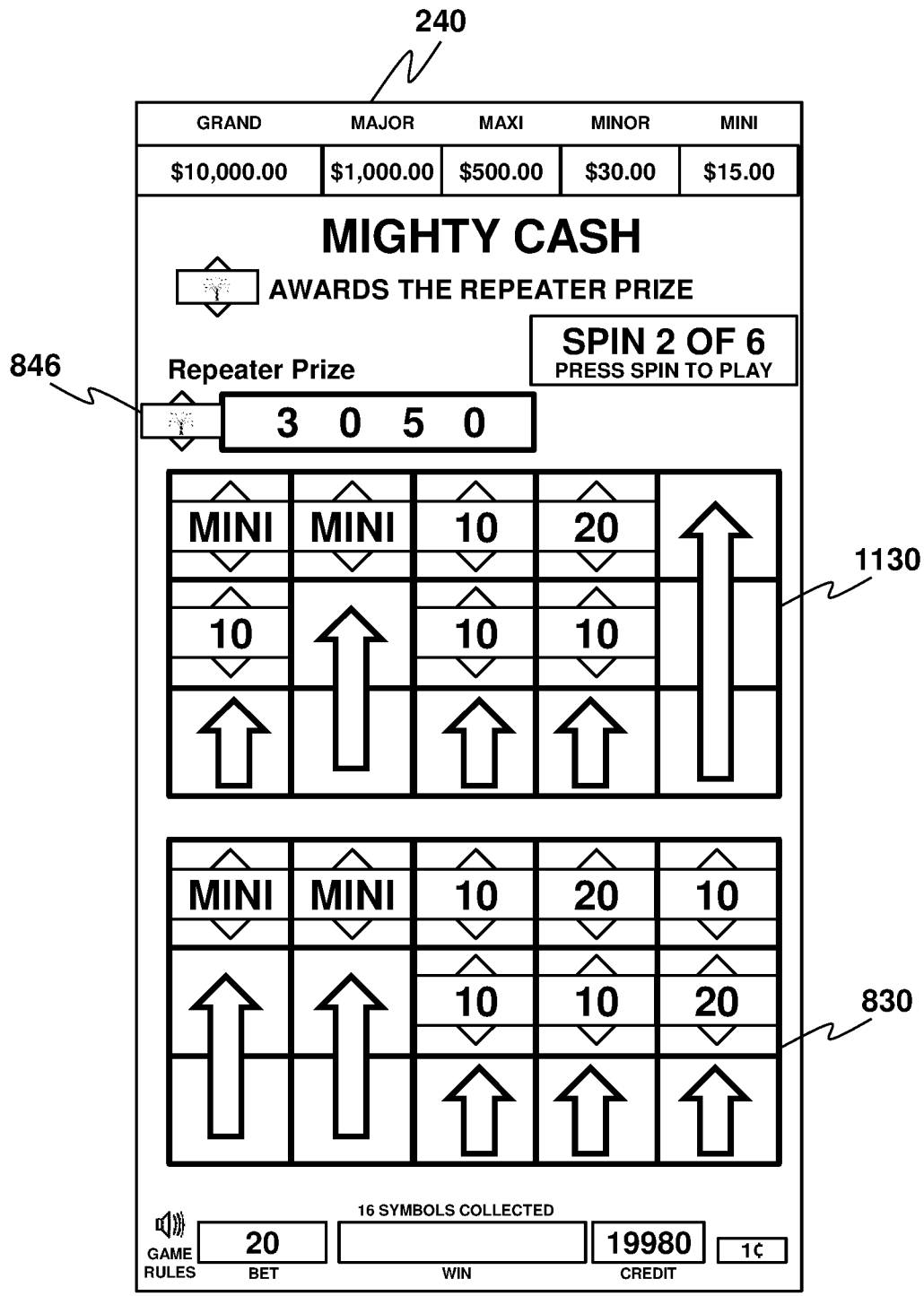
Figure 11F:
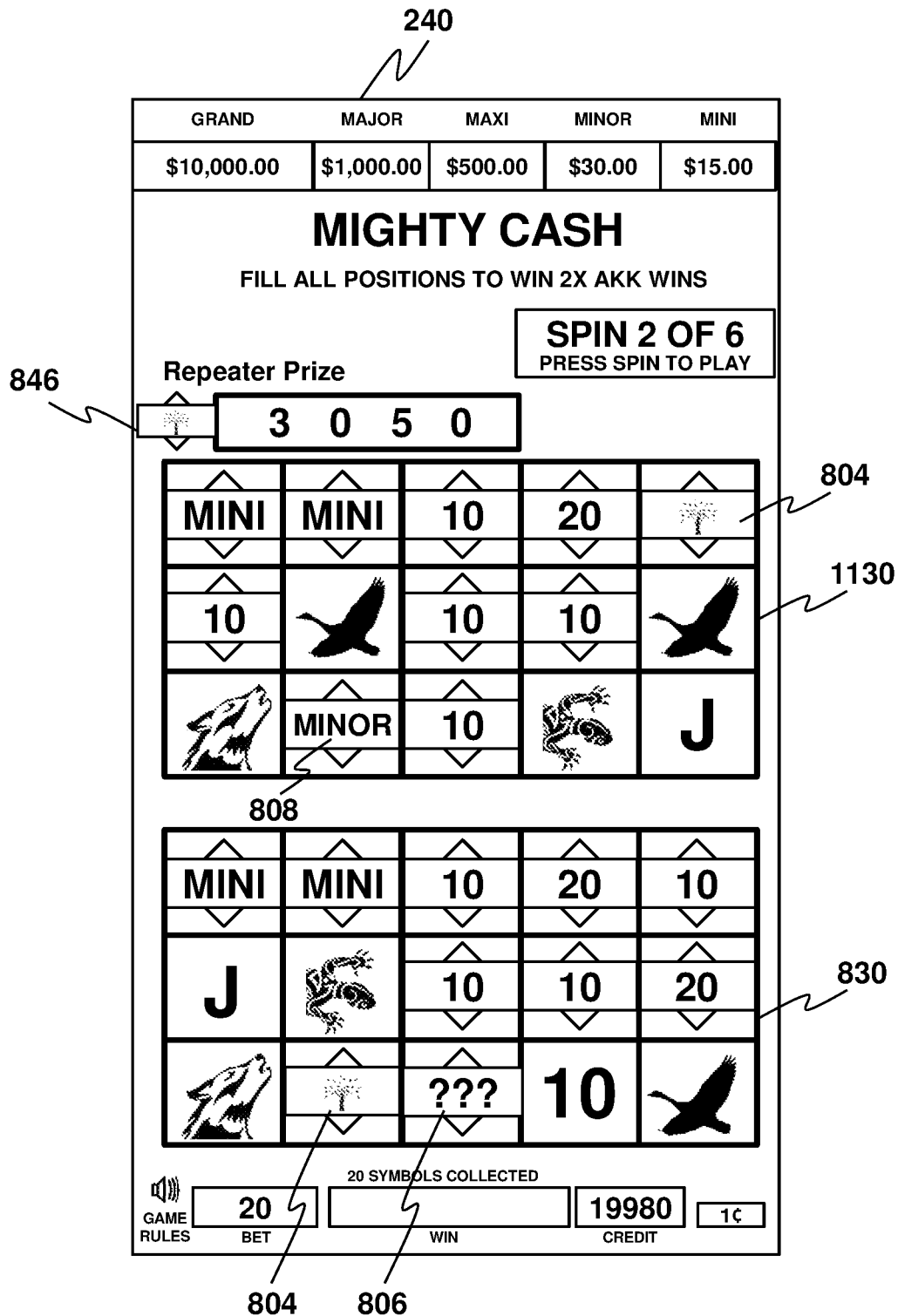

The player is then optionally prompted to initiate a second spin of the feature game. During the second spin, the configurable symbols that were previously awarded (collected) are held in place on the display matrices 830, 1130 and the reels are shown spinning in the other symbol positions of each matrix. FIG. 11E shows the display 240 during the second spin of the feature game, and FIG. 11F shows the reels in their stopped position to provide a game outcome following the second spin of the feature game. As shown in FIG. 11F, the second spin resulted in the award of two additional configurable symbols in each display matrix 830, 1130. In particular, the first matrix 830 has collected a repeater symbol 804 and a mystery symbol 806, while the second matrix 1130 has collected an MINOR jackpot symbol 808 and a repeater symbol 804. As discussed above, the value of the mystery symbol 804 may be determined using a valuation game, such as a spinning wheel game. (See, e.g., FIG. 9A), and the repeater symbols may be modified to display the repeater prize value (3050 in this example).

Figure 11G:
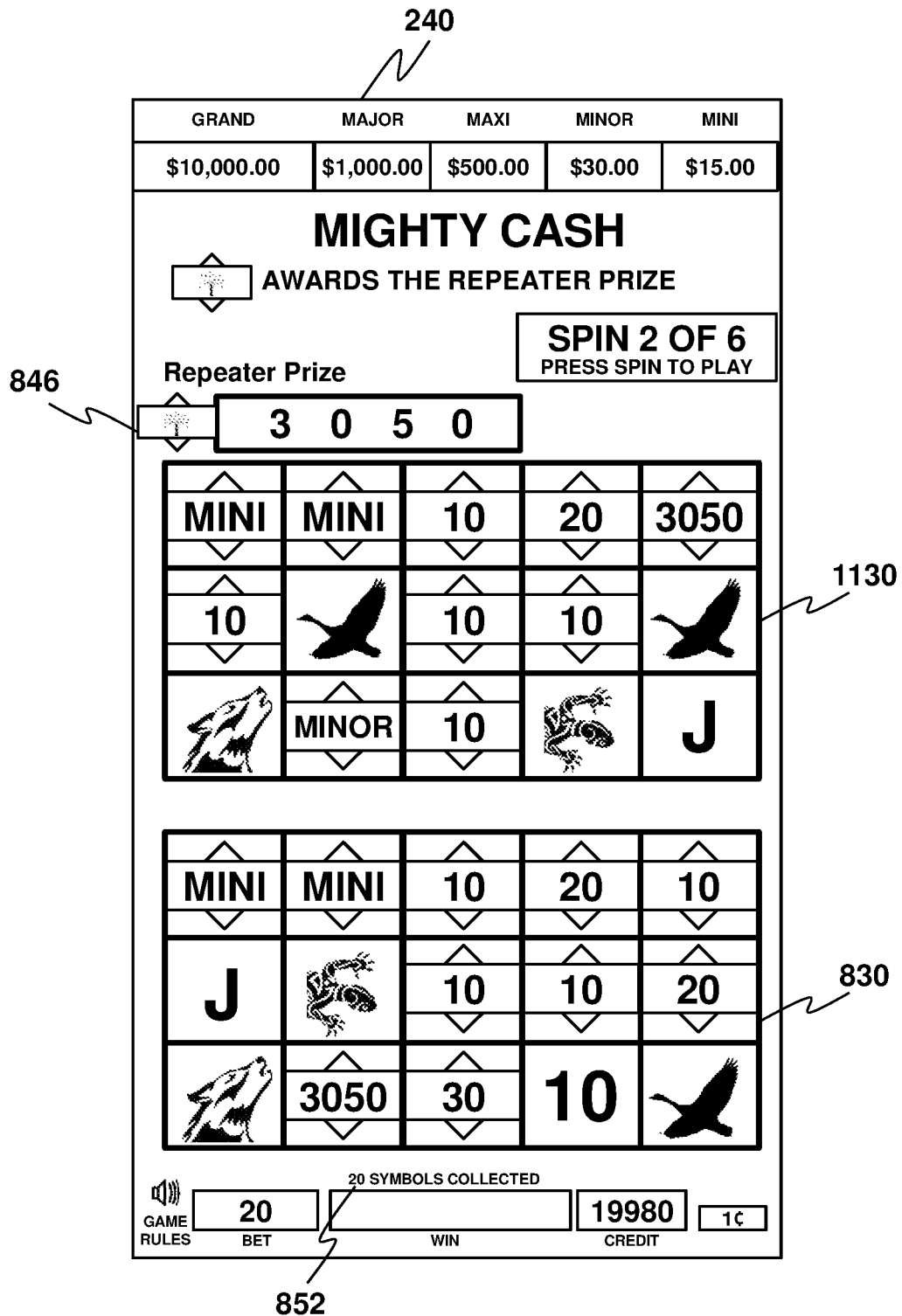

FIG. 11G shows the display after the repeater and mystery symbols that were awarded during the second spin have been modified to show their determined values, e.g., 3050 credits for the repeater symbol and 30 credits for the mystery symbol.

The feature game continues in the manner described until all of the spins have been completed. Once the feature game is completed, the gaming device 200 determines and pays out a feature game award. For example, if neither of the matrices 830, 1130 is fully populated with configurable symbols, the player may be awarded a prize amount corresponding to the accumulated value of the displayed configurable symbols. However, if one or both of the matrices 830, 1130 awarded the player may be awarded an enhanced award, e.g., via the second valuation game. (See, e.g., FIG. 9B). In various embodiments, if both (in cases where there are two instances of the feature game) are populated with configurable symbols, then an additional prize, such as a multiplier, jackpot, etc. may be awarded. In various embodiments, if more than one (in cases where there are more than two instances of the feature game) are populated with configurable symbols then an additional prize, such as a multiplier, jackpot, etc. may be awarded for each of the instance that that is populated with configurable symbols.

Figure 12A:
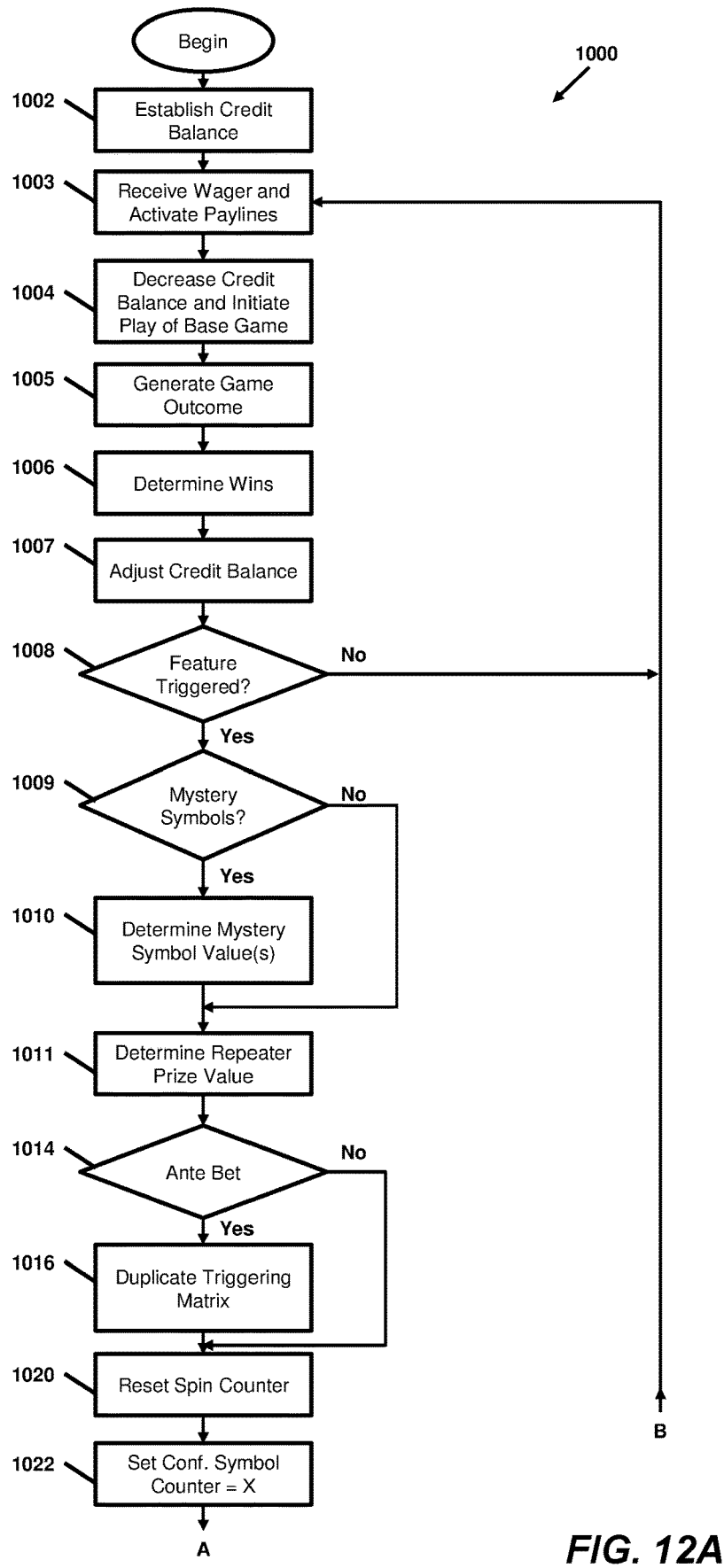
FIGS. 12A and 12B are a flow diagram for another example embodiment of a process for operating the EGM of FIG. 2 in accordance with various aspects of the present disclosure.
Figure 12B:
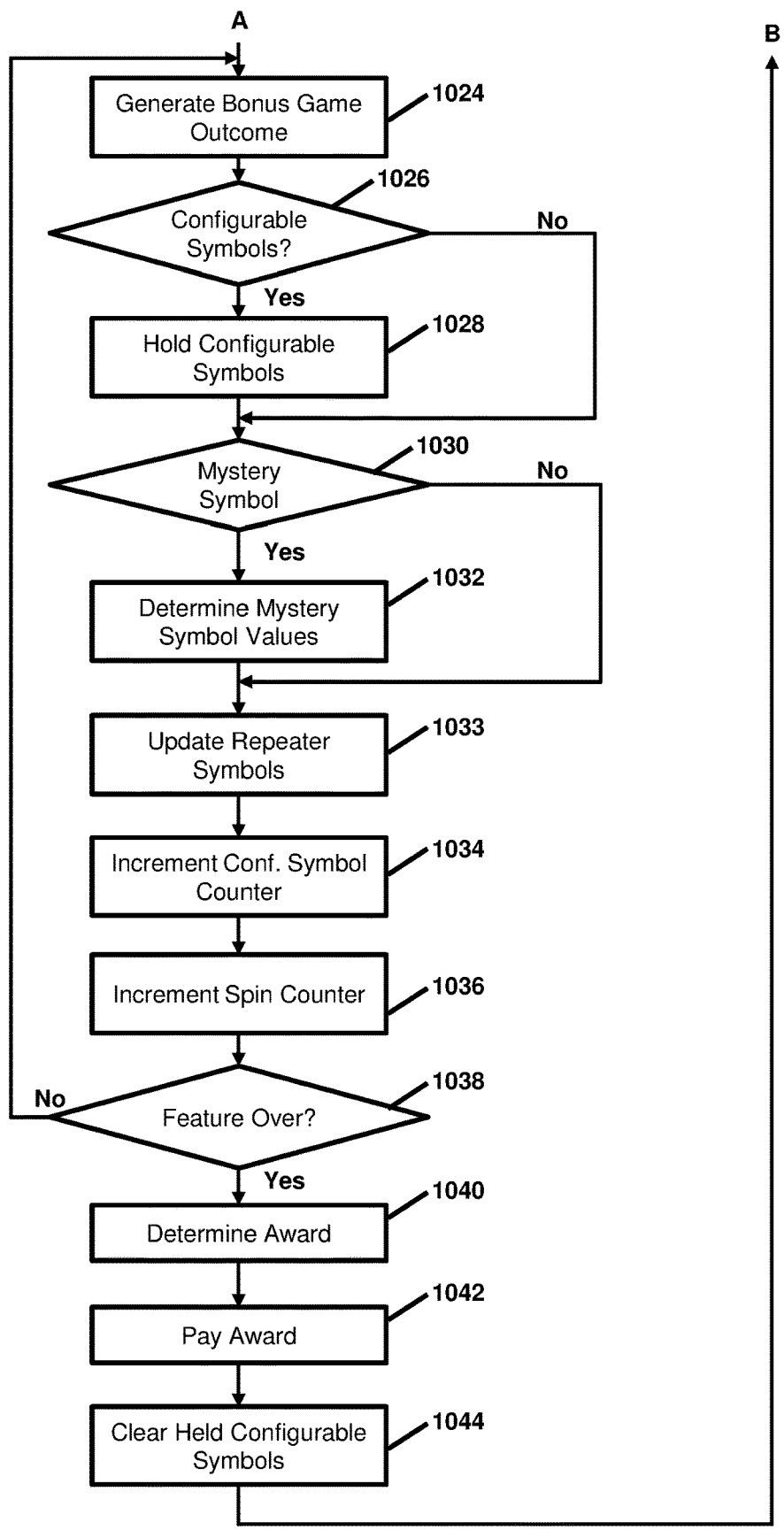

FIGS. 12A and 12B are a flow diagram for implementing an embodiment of the feature game with multiple game instances. The flow diagram of FIGS. 12A and 12B is similar to that of FIGS. 10A and 10B, except for the addition of steps 1014 and 1016, which cause the triggering base game outcome to be replicated when the player has placed the ante bet. Briefly, with reference to FIG. 12A, game play proceeds in the manner described above in connection with FIGS. 10A and 10B until reaching step 1014. At 1014 the gaming device 200 determines if the player has placed an ante bet. For example, in some embodiments, the gaming device 200 allows the player to place an ante bet via the player input buttons 236. In some embodiments, the ante bet may be placed contemporaneously with the wager on the base game. In some embodiments, the player may be allowed to place the ante bet at some other point during game play. For example, in some embodiments, the player may be prompted to place an ante bet upon triggering the feature game. In some embodiments, the number of additional game instances in the feature game is dependent on the size of the ante bet. For example, a first ante bet may result in two game instances, a second, larger ante bet may provide three game instances, etc.

If no ante bet was placed, control moves to 1020. Conversely, if an ante bet was placed, control moves to 1016 where the gaming device 200 replicates the triggering base game outcome (of matrix 830) so that the feature game initially begins with two identical matrices 830 and 1130. As was noted above, in other embodiments, the additional display matrix (or matrices) may include any number or type of symbols from the triggering base game outcome, e.g., only replicates the configurable symbols or only the highest value configurable symbols.

Upon creating the additional game instance(s) in 1016, control moves to 1020 where the process continues in the manner described above in connection with FIGS. 10A and 10B, except that each game instance (matrix) is played independently during the hold and spin feature.

Although the flowchart of FIGS. 10A, 10B, 12A, and 12B shows a specific order of execution, it is understood that the order of execution may differ from that which is depicted. For example, the order of execution of two or more blocks may be scrambled relative to the order shown. Also, two or more blocks shown in succession in FIGS. 10A, 10B, 12A, and 12B may be executed concurrently or with partial concurrence. Further, in some embodiments, one or more of the blocks shown in FIGS. 10A, 10B, 12A, and 12B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

What is claimed is:

1. An apparatus comprising:
    a memory device storing data indicative of a set of symbols, the set of symbols including a plurality of configurable symbols and a plurality of non-configurable symbols, each configurable symbol displaying a value associated therewith;
    a user interface;
    a display device; and
    a controller executing instructions stored in the memory device which cause the controller to at least:
        initiate a first symbol presentation stage based on the input received via the user interface;
        generate a first symbol presentation stage outcome by selecting and displaying a plurality of symbols at a plurality of display positions of a first display matrix on the display device, wherein the plurality of symbols is selected from the configurable symbols and the non-configurable symbols;
        initiate a second symbol presentation stage with an initial quantity of rounds when the first symbol presentation stage outcome includes a triggering number of configurable symbols;
        upon initiating the second symbol presentation stage, display at least one additional display matrix on the display in response a trigger condition, each additional display matrix initially displaying all the configurable symbols from the first symbol presentation stage outcome that triggered the second symbol presentation stage;

for each round of the initial quantity of rounds of the second symbol presentation stage, separately for each of the first display matrix and the at least one additional display matrix:
retain each configurable symbol from the first symbol presentation stage outcome at its corresponding display position of a respective display matrix; and
select and display replacement symbols for non-configurable symbols in a plurality of display positions not occupied by the retained configurable symbols; and
determine a second symbol presentation stage result based at least in part on a value of each configurable symbol displayed at the end of the second symbol presentation stage.

2. The apparatus of claim 1, wherein the instructions further cause the controller to determine the second symbol presentation stage award based at least in part on a sum of values of the configurable symbols displayed at a completion of the second symbol presentation stage.

3. The apparatus of claim 1, wherein the instructions further cause the controller to determine an enhanced award when a determined number of configurable symbols are displayed in at least one display matrix.

4. An apparatus comprising:
a memory device storing data indicative of a set of symbols for a first symbol presentation stage and a second symbol presentation stage, the set of symbols including a plurality of configurable symbols and a plurality of non-configurable symbols;
a display device;
a user interface; and
a controller executing instructions stored in the memory device which cause the controller to at least:
display the first symbol presentation stage via a first display matrix, the first symbol presentation stage comprising a plurality symbols selected from the symbol set in response to input received via the user interface;
trigger the second symbol presentation stage in response to a first triggering condition,
in response to triggering of the second symbol presentation stage,
display a second display matrix, separate from the first display matrix, in response to occurrence of a second triggering condition, the second display matrix initially displaying all the configurable symbols displayed in the first display matrix;
for the first display matrix:
display a retaining of any configurable symbols; and
replace each non-configurable symbol, if any, with a symbol selected from the set of symbols; and
for the second display matrix:
display a retaining of any configurable symbols; and
replace each non-configurable symbol, if any, with a symbol selected from the set of symbols.

5. The apparatus of claim 4, wherein the first triggering condition comprises a determined number of configurable symbols being displayed in the first display matrix.

6. The apparatus of claim 4, wherein the instructions further cause the controller to display a third display matrix.

7. The apparatus of claim 4, wherein the second symbol presentation stage comprises a quantity of rounds, and the instructions further cause the controller to, for at least one round in the quantity of rounds, for the second display matrix:
replace each displayed non-configurable symbol, if any, with a symbol selected from the set of symbols; and
keep each displayed configurable symbol for a remainder of the quantity of rounds.

8. The apparatus of claim 4, wherein the instructions further cause the controller to determine a second symbol presentation stage result based at least in part on a sum of values of the configurable symbols displayed by the first display matrix and the second display matrix at a completion of the second symbol presentation stage.

9. The apparatus of claim 8, wherein the instructions further cause the controller to determine an enhanced second symbol presentation stage result when a determined number of configurable symbols are displayed in at least one of the first display matrix or the second display matrix.

10. A method comprising:
displaying a first symbol presentation stage via a first display matrix presented on a display in response to input received via a user interface, wherein the first display matrix displays a plurality of symbols selected from a set of symbols for the first symbol presentation stage and a second symbol presentation stage, the set of symbols comprising configurable symbols and non-configurable symbols;
trigger a second symbol presentation stage in response to the occurrence of a first triggering condition;
in response to triggering of the second symbol presentation stage,
displaying at least one additional display matrix in response to occurrence of a second triggering condition, the at least one additional display matrix initially replicates the configurable symbols, if any, displayed in the first display matrix; and
separately for each display matrix:
retaining of any configurable symbols in a respective display matrix; and
replacing each non-configurable symbol, if any, with a symbol selected from the set of symbols.

11. The method of claim 10, wherein the first triggering condition comprises a determined number of configurable symbols being displayed in the first display matrix.

12. The method of claim 10, wherein the second symbol presentation stage comprises a quantity of rounds, and wherein, for at least one round in the quantity of rounds, the method further comprises, separately for each display matrix, replacing each displayed non-configurable symbol, if any, with a symbol selected from the set of symbols; and keeping each displayed configurable symbol for a remainder of the quantity of rounds.

13. The method of claim 10, further comprising determining a second symbol presentation stage result based at least in part on a sum of values of the configurable symbols displayed by the first display matrix and each of the at least one additional display matrix at a completion of the second symbol presentation stage.

* * * * *